US012147507B2

(12) United States Patent
Waid et al.

(10) Patent No.: US 12,147,507 B2
(45) Date of Patent: *Nov. 19, 2024

(54) MEDIA CONTENT FEED FORMAT FOR MANAGEMENT OF CONTENT IN A CONTENT HOSTING WEBSITE

(71) Applicant: Google LLC, Mountain View, CA (US)

(72) Inventors: Frey Waid, San Francisco, CA (US); Matthew Good, San Francisco, CA (US)

(73) Assignee: Google LLC, Mountain View, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 17/699,722

(22) Filed: Mar. 21, 2022

(65) Prior Publication Data

US 2022/0215072 A1 Jul. 7, 2022

Related U.S. Application Data

(63) Continuation of application No. 16/266,527, filed on Feb. 4, 2019, now Pat. No. 11,281,748, which is a
(Continued)

(51) Int. Cl.
*G06F 7/04* (2006.01)
*G06F 17/30* (2006.01)
(Continued)

(52) U.S. Cl.
CPC ........ *G06F 21/10* (2013.01); *G11B 20/00086* (2013.01)

(58) Field of Classification Search
CPC ........ G06Q 30/00; H04L 63/20; H04L 63/102
(Continued)

(56) References Cited

U.S. PATENT DOCUMENTS 5,745,879 A * 4/1998 Wyman ............... G06F 21/10
705/1.1
6,173,317 B1 * 1/2001 Chaddha ............. H04L 29/06
709/219
(Continued)

FOREIGN PATENT DOCUMENTS

JP 2005124168 5/2005
JP 2005124168 A * 5/2005 ........... H04L 67/104
(Continued)

OTHER PUBLICATIONS

European DOI Registration Agency. Media-related Identification and Metadata Standards. (Dec. 5, 2002). Retrieved online Jan. 29, 2021. https://www.medra.org/stdoc/md_standards.pdf (Year: 2002).*
(Continued)

*Primary Examiner* — James A Reagan
(74) *Attorney, Agent, or Firm* — Shumaker & Sieffert, P.A.

(57) ABSTRACT

A system and method for providing a content feed file for a content file to a content host. The method comprises delivering the content file and the content feed file to the content host, wherein the content feed file comprises one or more policies and the one or more policies direct the content host to manage the content file according to the one or more policies. After the content host processes the content file according to the provided policies, the content owner receives a status report wherein the status report comprises information about actions taken by the content host according to the one or more policies.

20 Claims, 3 Drawing Sheets

Related U.S. Application Data continuation of application No. 15/714,056, filed on Sep. 25, 2017, now Pat. No. 10,198,559, which is a continuation of application No. 12/340,292, filed on Dec. 19, 2008, now Pat. No. 9,773,098.

(60) Provisional application No. 61/015,118, filed on Dec. 19, 2007.

(51) Int. Cl.
  *G06F 21/10* (2013.01)
  *G11B 20/00* (2006.01)
  *H04N 7/16* (2011.01)

(58) Field of Classification Search
  USPC .......................................................... 726/26
  See application file for complete search history.

(56) References Cited

U.S. PATENT DOCUMENTS

| | | | |
|---|---|---|---|
| 6,240,555 B1* | 5/2001 | Shoff | H04N 5/44591 725/110 |
| 7,043,473 B1 | 5/2006 | Rassool et al. | |
| 7,296,235 B2* | 11/2007 | Bhat | G06T 11/001 715/744 |
| 7,925,973 B2* | 4/2011 | Allaire | H04N 21/25891 715/248 |
| 7,945,555 B2* | 5/2011 | Sankaran | G06F 16/353 707/710 |
| 8,181,220 B2* | 5/2012 | Gilchrist | G06F 21/105 380/59 |
| 8,238,669 B2 | 8/2012 | Covell et al. | |
| 8,447,032 B1 | 5/2013 | Covell et al. | |
| 9,038,108 B2* | 5/2015 | McCausland | H04L 67/56 725/47 |
| 9,626,667 B2* | 4/2017 | Boccon-Gibod | H04L 9/3271 |
| 9,773,098 B1* | 9/2017 | Waid | G06F 21/10 |
| 10,198,559 B2* | 2/2019 | Waid | G06F 21/10 |
| 11,281,748 B2 | 3/2022 | Waid et al. | |
| 11,746,339 B2 | 9/2023 | Schafer et al. | |
| 11,765,292 B2 | 9/2023 | Miyamoto | |
| 2001/0010045 A1* | 7/2001 | Stefik | G06Q 30/04 705/51 |
| 2002/0129140 A1* | 9/2002 | Peled | H04L 63/0245 709/224 |
| 2003/0004880 A1* | 1/2003 | Banerjee | G06F 16/958 705/51 |
| 2003/0014483 A1* | 1/2003 | Stevenson | H04L 29/06 709/203 |
| 2003/0105721 A1* | 6/2003 | Ginter | G06F 21/71 705/54 |
| 2004/0010417 A1* | 1/2004 | Peled | G06Q 30/06 709/225 |
| 2004/0022444 A1* | 2/2004 | Rhoads | G06K 9/222 382/232 |
| 2004/0199472 A1* | 10/2004 | Dobbins | H04L 12/1482 705/50 |
| 2004/0249768 A1* | 12/2004 | Kontio | G06Q 20/3674 705/65 |
| 2005/0011947 A1* | 1/2005 | Reddy | H04L 63/12 235/380 |
| 2005/0091415 A1* | 4/2005 | Armitano | H04N 1/00037 710/1 |
| 2006/0236221 A1* | 10/2006 | McCausland | G11B 27/034 715/201 |
| 2006/0239503 A1* | 10/2006 | Petrovic | H04L 9/002 380/54 |
| 2006/0253542 A1* | 11/2006 | McCausland | H04L 51/04 709/207 |
| 2007/0038931 A1* | 2/2007 | Allaire | G06Q 30/0239 715/206 |
| 2007/0073837 A1* | 3/2007 | Johnson-McCormick | G06F 16/48 709/217 |
| 2007/0100768 A1* | 5/2007 | Boccon-Gibod | H04L 9/0825 705/59 |
| 2007/0143855 A1* | 6/2007 | Gilchrist | G06F 21/105 726/1 |
| 2007/0162300 A1* | 7/2007 | Roever | G06Q 30/06 705/902 |
| 2007/0162400 A1* | 7/2007 | Brew | G06F 21/6236 705/59 |
| 2007/0192352 A1* | 8/2007 | Levy | G06Q 10/06 707/999.102 |
| 2007/0208711 A1* | 9/2007 | Rhoads | H04N 21/252 |
| 2008/0195664 A1* | 8/2008 | Maharajh | H04L 67/306 |
| 2009/0069913 A1 | 3/2009 | Stefik | |
| 2010/0067705 A1* | 3/2010 | Boccon-Gibod | G06F 21/10 380/285 |

FOREIGN PATENT DOCUMENTS

| | | | |
|---|---|---|---|
| KR | 20080107737 | 12/2008 | |
| KR | 20080107737 A | * 12/2008 | ............ G06F 21/00 |
| WO | WO 2010011344 | 1/2010 | |
| WO | WO-2010011344 A1 | * 1/2010 | ........... G06K 9/6857 |

OTHER PUBLICATIONS

Google. Google Data APIs Protocol Reference. (Apr. 27, 2006). Retrieved online Jun. 16, 2021. https://developers.google.com/gdata/docs/1.0/reference (Year: 2006).*
Cheung, S.S., et al., "Efficient Video Similarity Measurement with Video Signature", Thesis, Department of Electrical Engineering and Computer Sciences, University of California, Berkeley, Feb. 2003, pp. 1-33.
European DOI Registration Agency, "Media-Related Identification and Metadata Standards", Dec. 5, 2020, pp. 1-100, available at: https://www.medra.org/stdoc/md_standards.pdf.
Google, "Google Data APIs Protocol Reference", last updated Mar. 2017, pp. 1-16, available at: http://developers.google.com/gdata/docs/1.0/reference.
Notice of Allowance dated May 30, 2017 in U.S. Appl. No. 12/340,292.
Notice of Allowance dated Sep. 21, 2018 in U.S. Appl. No. 15/714,056.
Notice of Allowance dated Nov. 10, 2021 in U.S. Appl. No. 16/266,527.
Office Action dated Jan. 27, 2012 in U.S. Appl. No. 12/340,292.
Office Action dated Feb. 3, 2021 in U.S. Appl. No. 16/266,527.
Office Action dated Mar. 2, 2015 in U.S. Appl. No. 12/340,292.
Office Action dated Mar. 5, 2018 in U.S. Appl. No. 15/714,056.
Office Action dated Apr. 7, 2021 in U.S. Appl. No. 16/266,527.
Office Action dated May 6, 2014 in U.S. Appl. No. 12/340,292.
Office Action dated Jun. 20, 2016 in U.S. Appl. No. 12/340,292.
Office Action dated Jun. 21, 2011 in U.S. Appl. No. 12/340,292.
Office Action dated Jun. 21, 2021 in U.S. Appl. No. 16/266,527.
Office Action dated Sep. 8, 2020 in U.S. Appl. No. 16/266,527.
Office Action dated Sep. 29, 2014 in U.S. Appl. No. 12/340,292.
Office Action dated Nov. 13, 2015 in U.S. Appl. No. 12/340,292.
Office Action dated Dec. 14, 2016 in U.S. Appl. No. 12/340,292.
Prosecution History from U.S. Appl. No. 12/340,292, now issued U.S. Pat. No. 9,773,098, dated Jun. 21, 2011 through May 30, 2017, 228 pp.
Prosecution History from U.S. Appl. No. 15/714,056, now issued U.S. Pat. No. 10,198,559, dated Mar. 5, 2018 through Jan. 4, 2019, 46 pp.
Prosecution History from U.S. Appl. No. 16/266,527, now issued U.S. Pat. No. 11,281,748, dated Sep. 8, 2020 through Nov. 10, 2021, 117 pp.

* cited by examiner

MEDIA CONTENT FEED FORMAT FOR MANAGEMENT OF CONTENT IN A CONTENT HOSTING WEBSITE

CROSS-REFERENCE TO RELATED APPLICATIONS

This application is a continuation of U.S. patent application Ser. No. 16/266,527, filed Feb. 4, 2019, which is a continuation of U.S. patent application Ser. No. 15/714,056, filed Sep. 25, 2017, which is a continuation of U.S. patent application Ser. No. 12/340,292, filed Dec. 19, 2008, which claims the benefit of U.S. Provisional Application No. 61/015,118 filed Dec. 19, 2007, each of which is hereby incorporated by reference herein in its entirety.

BACKGROUND

Field

The present invention generally relates to management of online content, and in particular, is directed towards media content feed format for management of online media content.

Description of the Related Art

The proliferation of web sites that allow users to upload multimedia content for mass viewing has brought with it a number of challenges, not the least of which has been how to detect and handle uploaded content in which other entities have rights.

Under the copyright laws of the United States and multiple other countries, a single work may have multiple copyright holders and various entities may hold other rights with regard to the content. For example, various entities have rights in a song—the author, the publisher, and the music label are just some of the many different entities that may have different rights and each may be entitled to control the use of their work, and/or to receive royalty payments under the various royalty schemes in force in a particular country. Videos have an additional layer of complexity, including, for example, synchronization rights to any music played along with the video.

While Performing Rights Organizations (PROs) such as The American Society of Composers, Authors and Publishers (ASCAP) exist to collect public performance royalties on behalf of the various copyright holders when their works are broadcast on the radio or on television, this type of collection mechanism is not available in the online environment; nor are performance rights sufficient—as noted above, mechanical, master use, synchronization and other rights must also be taken into account.

Furthermore, before appropriate actions can be taken with regard to rights holders, content must be correctly identified. Given the nature of user-generated content (UGC), that is, content provided by users to a web site, detecting content subject to the rights of others has proven to be very difficult. For example, a user may select a commercially available song, which is subject to copyright restrictions, and combine it with homemade video to which the user herself holds the copyright. UGC including, for example, copyrighted video may escape detection by being slightly different, e.g., through cropping or editing, than a reference video.

SUMMARY

The present invention enables content rights holders to provide digital content items to a hosting site to be used as reference content items in a content feed, using a predefined content feed specification. The content feed specification enables the content owner or rights holder (hereinafter called the "content owner" for brevity) to easily bulk upload and manage large quantities of content items, without having to manually upload each content item individually. In addition, after content items are uploaded, the content feed specification enables the content owner to manage the uploaded content, including modifying any metadata for any number of media items. The content feed specification further enables the content owner to specify a rights management policy for each digital content item, indicating how that content may be used on the site when a match is found between the content and content uploaded by someone other than the content owner.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
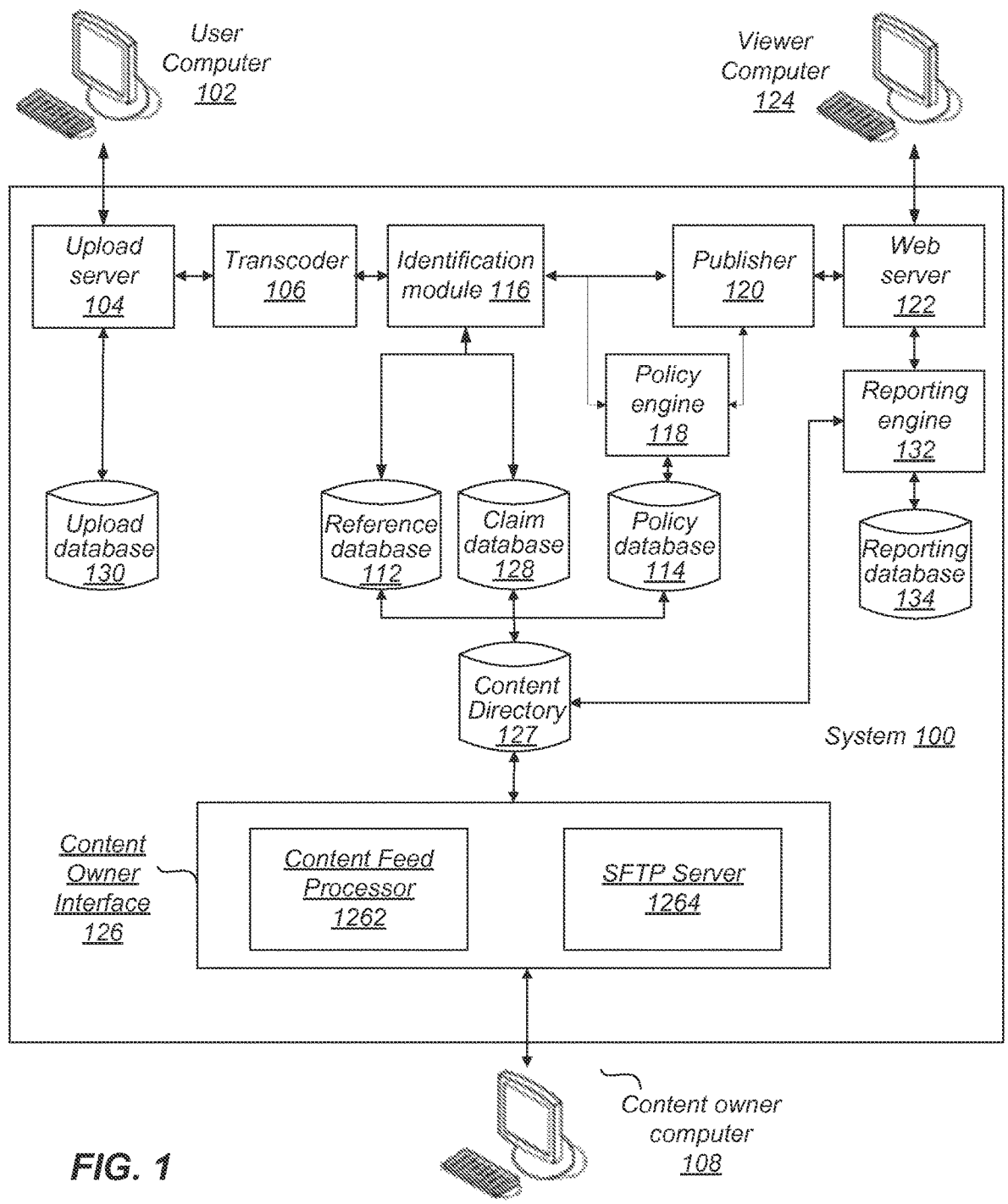
FIG. 1 is an illustration of a system for providing content rights management in accordance with an embodiment of the present invention.

FIG. 1 illustrates a system for providing content rights management in accordance with an embodiment of the present invention. Content hosting system 100 includes an upload server 104, an upload database 130, a transcoder 106, an identification module 116, a policy engine 118, a publisher 120, a web server 122, a reference database 112, a claims database 128, a policy database 114, a content owner directory 127, a reporting engine 132, a reporting database 134 and a content owner interface 126. The content owner interface 126 includes a content feed processor 1262 and an SFTP server 1264. FIG. 1 also includes a user computer 102, viewer computer 124, and content owner system 108. Each of these is described further below.

Although only a single upload server 104 and a single web server 122 are illustrated in FIG. 1 for clarity, each can be implemented as multiple servers. Other servers may handle other aspects of the host site not discussed here. It will also be understood that the described uploading and downloading or viewing of content is not intended to be limited to content uploaded or downloaded via the Internet or the HTTP protocol. Furthermore, in general, functions described in one embodiment as being performed on the server side can also be performed on the client side in other embodiments if appropriate. User computer 102, content owner 108, and viewer 124 can any type of computing device, a laptop, desktop, cell phone, handheld device, thin or thick client device, video appliance, workstation, or any other appropriate computing platform.

A content owner system 108 is a computer system operated by entity that owns or controls at least some of the rights to a particular work. The content owner may be an individual, a group of individuals, or an entity such as music or video production company or studio, artists' group, royalty collection agency, or the like.

As noted, UGC may include audio, video, a combination of audio and video, or still images. For ease of description, the examples illustrated below assume that the UGC is video; those of skill in the art will appreciate that audio, audio combined with video, and still images can be received, identified, and acted upon in a similar way as is described here. Furthermore, a user computer that receives UGC from system 100 is referred to as a viewer 124. In various embodiments, viewer 124 may consume the UGC via download of the file, by streaming, or by any other method of retrieving media content over a network. Of course, a user computer 102 can also serve as a viewer 124 and vice versa.

Content owner interface 126 enables content owners 108 to provide content items to system 100, including reference content items and content feed files that include rights management policy information, and further allows content owners to review and make claims to UGC that appears to implicate the rights of the content owner. The content owner interface 126 provides an application programming interface (API) that exposes the functionality described herein for uploading and managing reference content items. Through content owner interface 126, system 100 receives reference content items and policy information from content owner computers 108 into a content directory 127 to which the content owner has secure access, and stores the received information in reference database 112 and policy database 114, respectively. In one embodiment, each item of reference content is assigned an identifier, and the identifier is additionally stored along with the policy information in policy database 114. Content owner interface 126 in one embodiment includes an SFTP server 1264 for uploading of content files and policy information from the content owner computers 108. The content owner interface 126 in one embodiment also includes content feed processor 1262 for processing the content feed file In addition to performing content matching at the time of video upload, one embodiment also enables content matching for "legacy" UGC videos that are already uploaded to system 100. Such legacy videos may not have matched at the time of upload, but would match subsequently as additional reference content is added. Such matching of legacy videos can be done, for example, periodically by rechecking all uploaded videos against the reference database 112. In one embodiment, such checking is done when a user requests to view or download a video.

A user of system 100 uses user computer 102 to provide user generated content (UGC) to upload server 104 of system 100. In one embodiment, user computer 102 uses a Web browser such as Microsoft Internet Explorer or Mozilla Firefox to access a web server running on upload server 104.

Figure 2:
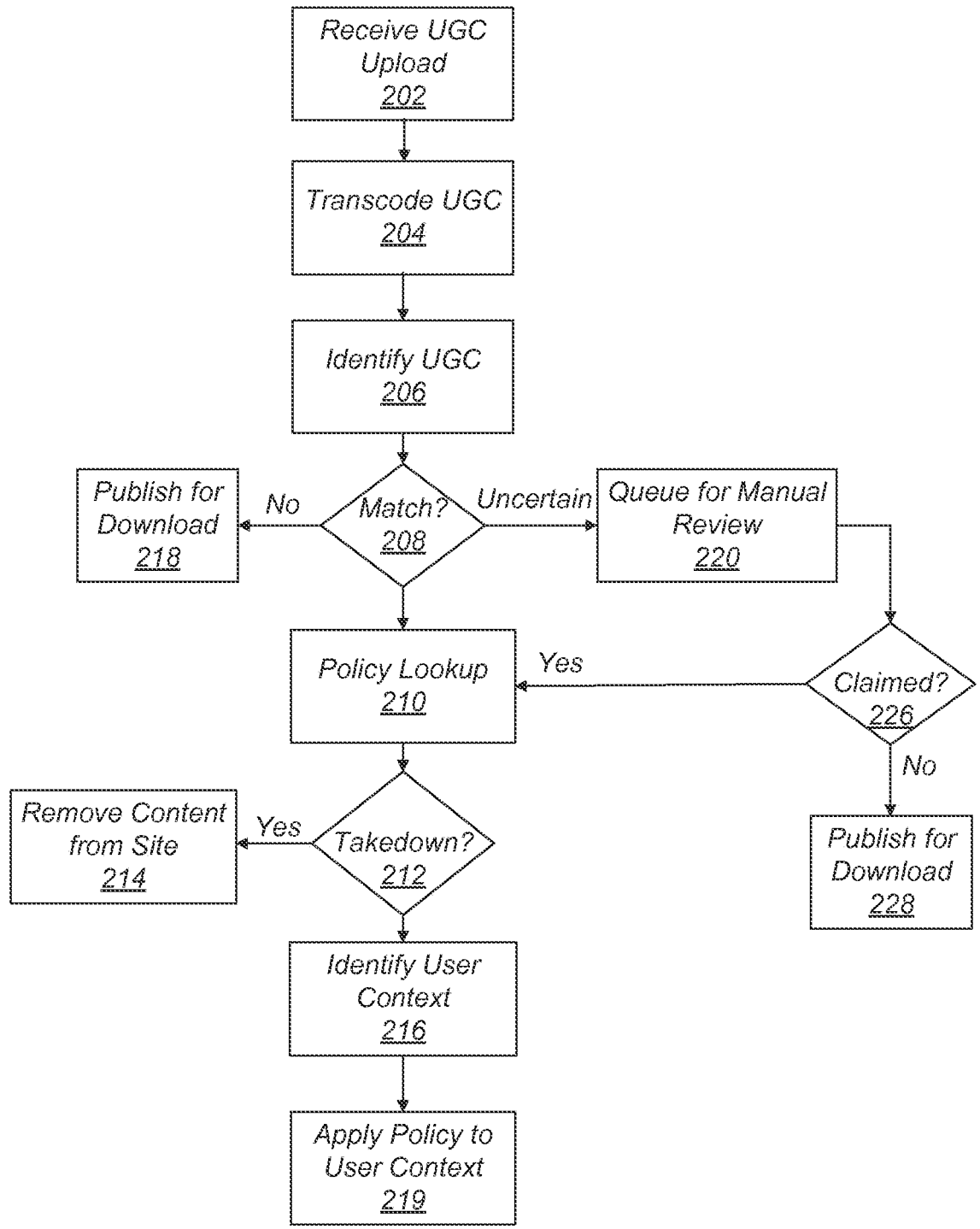
FIG. 2 is a flowchart illustrating a method for providing content rights management in accordance with an embodiment of the present invention.

FIG. 2 is a flow chart illustrating a method for providing content rights management in accordance with an embodiment of the present invention. First, upload server 104 receives 202 the UGC from user computer 102, and stores it, in one embodiment in upload database 130.

Transcoder 106 converts 204 the UGC from one file type to another, in order to standardize content for playback to viewers 124. This enables upload server 104 to accept UGC provided in various different formats, while still being able to provide a standardized output to viewers 124. In one embodiment, transcoder 106 transcodes uploaded video content into the Adobe (.flv) flash file format.

Identification module 116 analyzes 206 the uploaded and transcoded UGC to determine whether it matches reference content stored in reference database 112. If a match is found 208, policy engine 118 looks up 210 the policy for the identified reference content and additionally logs the match in claim database 128 for subsequent review by content owner 108. In one embodiment a fingerprinting methodology is used to compare the UGC to the reference content. Additional techniques such as watermarking, MD5 encoding, facial recognition, logo recognition, and visual inspection by humans may also be used in various embodiments.

The identification module 116 enables a content owner to identify user-uploaded content that may consist entirely or partially of the content owner's work. The content owner can specify in the content feed file whether to have system 100 remove the user-uploaded content, track the progress of the user-uploaded content, or include the user-uploaded content in their revenue-sharing agreements with system 100. (As further explained below, the <yt:ugc> tag definition explains how rights holders can set this policy for individual videos in their feeds.)

Identification module 116 uses several mechanisms to identify user-uploaded content that may potentially include a content owner's content. These mechanisms include the following:

MD5 Hashes—Identification module 116 uses the checksum of the video binary that the user uploads to create an MD5 hash. Identification module 116 then compares that MD5 hash to reference hashes stored in reference database 112. Hash comparisons work when two videos are completely identical.

Video ID files—Identification module 116 creates frame-by-frame video ID files (also known as video fingerprints) of a content owner's content and then matches user uploads to those files. The video ID files are stored in reference database 112. When matching frames are found, identification module 116 then compares frames sequentially before and after the matching frames to determine whether the user upload actually matches the content owner's content. The video ID files also account for video degradation and inversion in user uploads.

Audio Identification—Identification module 116 also create audio ID files, or audio fingerprints, for all content uploaded by system 100's audio content partners. In one embodiment, the audio fingerprints are generated using technology provided by Audible Magic Inc. of Los Gatos, California. Identification module 116 maintains these ID files in reference database 112 and compares the ID files for new user uploads to the ID files in the reference database 112. Audio ID files can be extremely robust in matching exact copies of the audio portion of short-form content and are designed to account for minor time discrepancies in the video. Audio identification is best suited for identifying unique audio content with pronounced distinguishing features.

Systems and methods for matching uploaded content against reference content are described for example in U.S. patent application Ser. Nos. 11/765,292; 11/746,339; 60/957,446; and 60/957,445, each of which is incorporated by reference herein. In one embodiment, UGC is analyzed in its uploaded format prior to being transcoded.

If the specified policy indicates that the content should be taken down 212, i.e. removed from the site, system 100 removes 214 the UGC from the site. If the policy does not specify a take down policy, then the user's context is identified 216. The user's context may include, for example, his region, his domain, the type of device he is using, and the like. Different policies may accordingly be specified by content owners 108 to be applied to each different user context. For example, for the particular item of UGC, a policy may specify revenue sharing in the United States, but block viewing of the content in the United Kingdom. Once the user's context has been identified, policy engine 118 applies 219 the appropriate policy.

Finally, if identification module 116 matches the UGC to an item of reference content, but with a confidence level less then a specified threshold, the UGC and suggested matching reference content is queued 220 for manual review by content owner 108. If content owner 108 claims 226 the content as its own, the content is treated 210 in accordance with the appropriate policy as described above. If, on the other hand, the content owner 108 does not claim the content as its own, the content is published 228 for viewing by viewers 124 without implementing any of the described policies. In either event, in one embodiment the UGC or its indicia is added to reference database 112 to improve accuracy of future identification attempts.

As discussed above, in one embodiment, content owner interface 126 includes an SFTP server 1264 for exchange of content files and policy information. Here, the content owner specifies the rights management policy information for the content file in a content feed file. The content feed file is an XML file containing XML tags that define policies for one or more content files. XML schemas provide an XML-based method of describing the structure of an XML document. XML schemas use the *.xsd file extension. Like DTD files, XML schemas define the elements and attributes that can appear in a document, indicate whether elements are empty or contain text, and define parent-child relationships between different XML elements. XML schemas are different from DTDs in a number of ways. First, XML schemas support data types, meaning they can define whether a particular field should hold an integer, string, date, float or other type of value. Second, XML schemas can restrict the acceptable set of values for a given field. In addition to defining a field as a string, an XML schema can also provide a list of acceptable strings for that field. Similarly, XML schemas can define an acceptable range of integers for an integer field.

Figure 3:
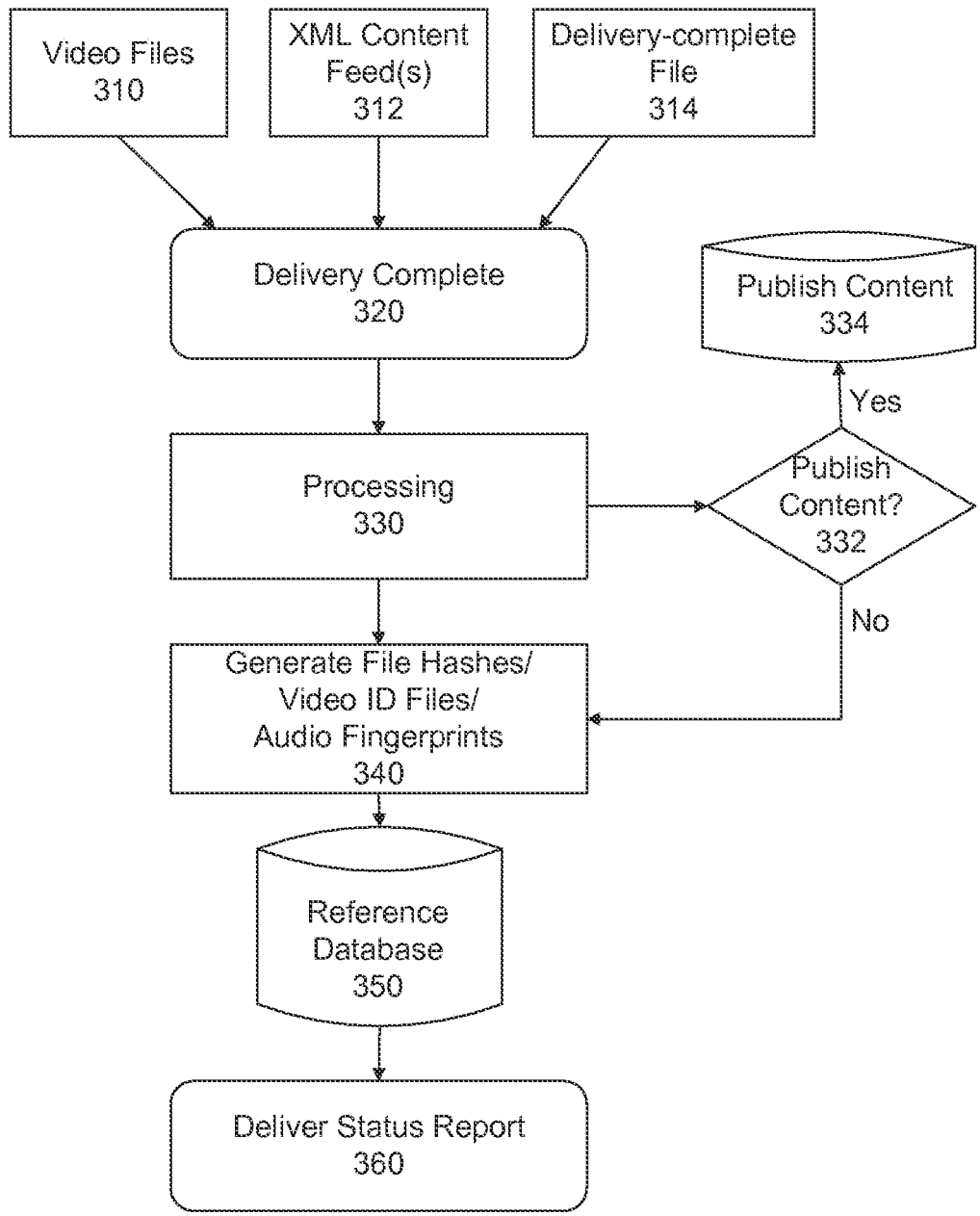
FIG. 3 is an illustration of a method for receiving reference content and policy information for the reference content in accordance with an embodiment of the present invention.

FIG. 3 is an illustration of a method for receiving reference content and a content feed file from the content owner. The content owner starts by creating a Secure File Transfer Protocol (SFTP) account on the SFTP server 1264 via the content owner interface 126. In this account, the content owner creates a content directory 127 into which the content owner will upload the content files and the content feed file. The content owner then supplies content files 310 and the corresponding XML content feed files 312 to content directory 127 through the content owner interface 126. The content files and the corresponding XML content feed file may be supplied together or separately. Once the content owner has uploaded the content files and the XML feed files, the content owner uploads 314 a delivery-complete file into the content directory 127. The presence of the delivery-complete file in this directory acts as a signal to the system 100 that the content owner has completed 320 all the required uploads, and the system 100 can begin processing the content files and content feed.

The content feed processor 1262 in content owner interface 126 processes 330 the received content and the corresponding XML content feed file. The content feed file uses tags and additional information according to a content feed format specification that provides the content owner with a full range of options specifying how system 100 should handle the content file(s). Generally, the content feed specification enables the owner to specify in the content feed file whether to publish the content for viewing or not, and various conditions pertaining to viewing and other content rights. If the content owner has indicated 332 in the content feed file to publish a content item, the system 100 publishes 334 the content item by forwarding the content or a content reference to publisher 120. Otherwise, the content remains private in the content owner's account. The identification module 116 generates 340 the file hashes, video fingerprints, and audio fingerprints from the content files. This information is then stored 350 in reference database 112. After processing the content feed files, the system 100 delivers 360 a status report detailing the action taken for each policy in the content feed. The status report can be named, for example, status-xml-filename, where xml-filename is the filename of the content feed file. The status report is made available to the content owner through content owner interface 126.

Formatting Guidelines for Content Items

A content owner can be either the copyright holder or other rights holder or the authorized representative of the copyright holder or other right holders for all video files the content owner delivers to system 100. If the content owners choose to have their videos be visible on system 100, the content owners preferably encode their videos according to the specifications below. The following section provides formatting guidelines for videos that the content owner would like to include in system 100's Content ID system. If the content owners are unable to encode their videos using these specifications, system 100 will format and will re-encode the content owner's video files to these specifications:

a. Video format—Flash 7 .flv (SQV 3 codec)
b. Video Bitrate—256 kbps (kilobits per second)
c. Framerate—30 frames per second
d. Resolution—320×240
e. Audio format—.mp3 (22 kHz sampling)
f. Audio Bitrate—64 kbps
g. Total Bitrate—320 kbps (kilobits per second)

The content owner can follow a recognizable naming convention for individual video files and reference video file names in the XML feeds.

The following guidelines outline exemplary specifications for videos that the content owner wants to include in system 100's as reference items for use by the identification module 116. These guidelines are broader than the specifications outlined above, which define the settings that system 100 can use to play videos that the content owner has elected to make publicly available.

File formats: system 100 can accept files in common video file formats, including .WMV, .AVI, .MOV, .MPG and .FLV.

Video frame rate: The content owner's video can be in its native frame rate. Typically, frame rates are set at 24, 25 or 30 frames per second.

Video aspect ratio: The following aspect ratios diminish the amount of processing that system 100 performs on content owner's video before generating a video ID file. Theatrical or widescreen videos can remain in their native aspect ratio. In addition, if theatrical releases have a "pan-and-scan" version as well as the original 16:9 version, both versions can be uploaded separately. If the video's native aspect ratio is 1.77:1 and the total frame size also has a 1.77:1 aspect ratio, the content owner can use 16:9 matting with square pixels and no border.

If the video's native aspect ratio is 1.77:1 and the total frame size does not have a 1.77:1 aspect ratio, the content owner can use 16:9 matting with square pixels and a single-color border with no variations over time.

If the video's native aspect ratio is 1.33:1 and the total frame size also has a 1.33:1 aspect ratio, the content owner can use 4:3 matting with square pixels and no border.

If the video's native aspect ratio is 1.33:1 and the total frame size does not have a 1.33:1 aspect ratio, the content owner can use 4:3 matting with square pixels and a single-color border with no variations over time.

Resolution: A content owner can sample videos to a typical quarter resolution near the ranges of 320×240, 352×240 or 352×288. System 100 can resize the content owner's videos to 320×240 resolution for playback.

Audio format: The content owner can encode the audio content in PCM or MP3 audio formats.

Duration/File Size: The content owner can have video or audio of variable duration. System 100 does not limit the duration of the content owner's videos.

Management Policies for Content Items

Different content rights owners typically have the need to apply different policies to their content items. In addition, a single rights owner has the need to apply different policies to different content items in the owner's portfolio. For example, a filmmaker may choose to send a hosting site two videos, one for a movie trailer and another for the full-length feature. The filmmaker could choose to make the trailer publicly visible and let the hosting site use the full-length feature only to prevent unauthorized uses of the film on the hosting site. Conversely, another filmmaker might adopt a different stance for its films and choose to make both videos publicly available and to display in-video ads in the full-length film. The content feed format specification enables content owners to define content management policies to achieve these various objectives.

The content feed specification is a set of XML (or other markup language) tags that are used to define the metadata of content items, and the rights management polices intended by the content owners. The tags have the general format:

<yt:tag> where yt is a prefix that identifies the namespace of the content hosting system 100, and tag is the specific markup tag that identifies an attribute or policy. Additional schemas can be used with identifying namespace prefixes, as further described below. Of course, the namespace prefix need not be used if only a single namespace is being used.

1. Policies Applicable to Videos

A first set of policies are applicable to video content items, regardless of whether those videos are publicly visible on the content hosting system 100; policies for content items that are intended to be publicly visible are described below.

The <yt:target> tag specifies whether a video will be publicly visible on the content hosting system 100 or if the content owners are providing the video for the sole purpose of enabling system 100 to match user-uploaded content to content owner's video. For each video that content owner provides, system 100 automatically claims the video for content owner's account, thereby identifying the content owner as the owner of that content. System 100 also creates a video ID file for each video that content owner uploads.

The video ID file is a frame-by-frame signature that system 100 uses to match user-uploaded content to content owner's video.

System 100's default policy can be to upload content owner's video so that it is publicly visible to system 100 website users. If the content owners do not want their video to be publicly visible on system 100, the content owners can include the <yt:target> tag for that video and set the tag's value to claim fingerprint as shown in the following example:

<yt:target>claim,fingerprint</yt:target>

The <yt:keep_fingerprint> tag determines whether system 100 will continue to compare user-uploaded content to a video if the content owner deletes that video from the system 100. This tag's value is considered if the content owner deletes a video. In effect, this tag indicates whether the content owner's deletion of a video is an indication that the content owner does not claim ownership of the content in the video. As noted in the discussion of the <yt:target> tag above, system 100 creates a video ID file for each video that the content owner provides. The <yt:keep_fingerprint> specifies whether that video ID file will remain active when the content owners delete their video. System 100's default policy can be that a video ID file will not remain active if the content owner deletes the corresponding video. As such, if the content owner deletes a video and then user uploads the same video, system 100 will not try to match the user-uploaded video to content owner's deleted video. System 100 will try to match the user-uploaded video to videos that the content owner has not deleted.

If the content owner wants the video ID file for a video to remain active when the content owner deletes that video, the content owner can set the value of the <yt:keep_fingerprint> tag to yes as shown in the following example:

<yt:keep_fingerprint>yes</yt:keep_fingerprint>

The <yt:ugc> tag specifies the action that system 100 will take if another user uploads a video that includes content owner's content. The content owner can specify that the user-uploaded video should be included in content owner's revenue-sharing agreement with system 100, blocked for certain territories on system 100 or tracked. The content owner specifies a value for this tag any time the content owner provides a new video to system 100 or replaces a video in system 100. If the content owner wants user-uploaded content that matches the content owner's content to automatically be blocked on system 100, the content owner can set the value of the <yt:ugc> tag to block. The following XML examples demonstrate possible values of the <yt:ugc> tag:

Example 1: system 100 will include the user-uploaded video in content owner's revenue-sharing agreement:
<yt:ugc>share</yt:ugc>

Example 2: system 100 will block the user-uploaded video for the specified territories:
<yt:ugc>block</yt:ugc>

Example 3: system 100 will track the user-uploaded video:
<yt:ugc>research</yt:ugc>

The <yt:territories> tag identifies one or more countries where the policies that the content owner sets for a video will be applied. If the value of the rule attribute is include, then the policies will be applied in the specified countries. If the value of the rule attribute is exclude, then the policies will not be applied in the specified countries. The following XML examples demonstrate usage of the <yt:territories> tag:

Example 1: system 100 will apply the policies for a video in the United States and England:

<yt:territories rule="include">US,GB</yt:territories>

Example 2: system 100 will not apply the policies for a video in Japan:

<yt:territories rule="exclude">JP</yt:territories>

2. Policies Applicable to Publicly Visible Videos

A second set of policies are used for videos that are publicly visible to users of system 100.

The <yt:commercial> tag indicates whether system 100 may use ads to generate revenue with respect to video. Any generated revenue is shared with the content owner as discussed in the content owner's partner agreement. The content owner specifies a value for this tag when the content owner provides a new video to system 100 or replaces a video in the system 100. The following XML examples demonstrate possible values of the <yt:commercial> tag:

Example 1: system 100 may use ads to generate revenue for a video:

<yt:commercial>share</yt:commercial>

Example 2: system 100 may not use ads to generate revenue for a video:

<yt:commercial>free</yt:commercial>

The <yt:invideo> tag indicates whether a video is eligible for an advertising program managed by system 100 in which advertisements are displayed along side videos being shown to users. System 100 checks the value of this tag if the content owner has specifically opted to participate in the advertising program. If the content owner has elected to participate, system 100's default policy is to allow the content owner's videos to display the advertisements. If the content owner does not want a video to display the advertisements, the content owner can set the value of the <yt:invideo> tag to Deny:

<yt:invideo>Deny</yt:invideo>

The <yt:allow_comments> tag indicates whether system 100 users will be allowed to post comments about a video. System 100's default policy is to allow all users to post comments about a video. The content owner can also specify that system 100 users are not allowed to post comments about a video or that users may post comments but the content owner will have an opportunity to approve comments before those comments are displayed to other users. The following XML examples demonstrate possible values of the <yt:allow_comments> tag:

Example 1: All users may post comments about a video.

<yt:allow_comments>Always</yt:allow_comments>

Example 2: The content owner has the opportunity to approve comments before system 100 displays them.

<yt:allow_comments>Approve</yt:allow_comments>

Example 3: Users are not allowed to post comments about a video.

<yt:allow_comments>Never</yt:allow_comments>

The <yt:allow_responses> tag indicates whether system 100 users will be allowed to post video responses to a video. System 100's default policy is to provide the content owner with an opportunity to approve video responses before system 100 displays them to other users. The content owner can also specify that all system 100 users may post video responses to a video or that system 100 users are not allowed to post video responses to that video. The following XML examples demonstrate possible values of the <yt:allow_responses> tag:

Example 1: All users may post video responses to a video:

<yt:allow_responses>Always</yt:allow_responses>

Example 2: The content owner has the opportunity to approve video responses before system 100 displays them. (This is the default policy.):

<yt:allow_responses>Approve</yt:allow_responses>

Example 3: Users are not allowed to post video responses to a video:

<yt:allow_responses>Never</yt:allow_responses>

The <yt:allow_ratings> tag indicates whether system 100 users can rate a video. System 100's default policy is to allow users to rate videos. If the content owner does not want to allow users to rate a video, the content owner can set the value of the <yt:allow_ratings> tag to false as shown in the following XML example:

<yt:allow_ratings>false</yt:allow_ratings>

The <yt:allow_embedding> tag indicates whether system 100 users can include a video on their own web pages. System 100's default policy is to allow users to embed videos on their own web pages. If the content owner does not want to allow users to embed a video on their own web pages, the content owner can set the value of the <yt:allow_embedding> tag to false as shown in the following XML example:

<yt:allow_embedding>false</yt:allow_embedding>

The <yt:distribution_rule> tag indicates whether system 100 can distribute a video through offline distribution channels, which might include mobile channels, IPTV, video on demand (VOD) and consumer devices. System 100's default policy is to allow a video to be distributed through channels other than the websites. If the content owner wants a video to be visible on system 100 (or other websites), the content owner can set the value of the <yt:distribution_rule> tag to Deny as shown in the following XML example:

<yt:distribution_rule>Deny</yt:distribution_rule>

The <yt:allow_embedding> and <yt:syndication>tags determine whether a video can be shown on websites other than a web site affiliated with system 100.

The <yt:syndication> tag specifies whether a video can be used in a content syndication program. Videos that are included can be shown on other websites that participate in system 100's content syndication program. If the content owners do not want their videos to be used in the content syndication program, the content owners can set the value of the <yt:syndication> tag to Deny as shown in the following XML example:

<yt:syndication>Deny</yt:syndication>

In one embodiment, the tag may have a different namespace like media instead of yt as discussed below. The different namespace demonstrates how system 100 can accept tags with various namespaces. For example, the <media: restriction> tag specifies the countries where playback of a video is allowed or prohibited. System 100's default policy is to allow playback of a video in all countries. The following XML examples demonstrate how to specify that the content owner has the right to distribute a video only in specific locations:

Example 1: This video may not be played in France or Germany:

<media:restriction relationship="deny" type="country">fr de</media:restriction>

Example 2: This video may only be played in the United States and Canada:

<media:restriction relationship="allow" type="country">us ca</media:restriction>

Formatting Requirements for Content Feed Files

The content feed files using the various policy tags set forth above are preferably formatted as follows.

First, certain characters can be escaped when included as values in XML tags. The content owner's XML processor can convert these characters into the appropriate escaped entity. Examples of these characters are presented in the table below:

| Character | | Escaped Forms | |
|---|---|---|---|
| | | Entity | Character Code |
| Ampersand | & | & | & |
| Single Quote | ' | ' | ' |
| Double Quote | " | " | " |
| Greater Than | > | > | > |
| Less Than | < | < | < |

The filename of each content feed file can include a timestamp that identifies the date and time that the content feed file was created. The timestamp can be formatted as YYYY-MM-DD-HHMM. For example, the following specifies a content feed file uploaded on Dec. 30, 2008 at 15:00 hours.

yt_metadata_2008-12-30-1500.xml.

The content owner can compress XML feeds using the .zip format.

Management of Content Items Using the <yt:action> Element

A content owner's content feed files instruct system 100 to execute any of the following operations for each video included in the content feed file. In a content feed file, the <yt:action> tag specifies the type of action that system 100 should take for each video.

The Insert action indicates that the content owner is providing metadata for a new video. When the content owner inserts a video, system 100 will create a new video resource and assign a video_id to that resource. The status report that system 100 posts for the content feed file will specify this new video_id.

The Update action indicates that the content owner is modifying the metadata for a video but the content owner is not changing the video content itself. For each update action, the content feed file will identify the video_id for the video for which the content owner is updating metadata as well as any metadata fields that the content owner is changing. The content owner may omit any data fields that are not changing. If an update includes the <media:content> tag, the value of that tag's attributes can be ignored.

The Delete action removes an existing video from system 100 if the video is publicly visible. This action also removes the video from system 100's reference database 112 unless the content owners use the <yt:keep_fingerprint> tag to explicitly denote in their content feed file that the content owner wants the video ID file for the deleted video to remain active. For each Delete action, the content feed file will identify the ID for the video the content owner is deleting.

The Replace action deletes an existing video and inserts a different video in its place. This action allows the content owner to update the metadata and the content for a video. However, when the content owner replaces a video, the content owner can provide a complete set of metadata for that video rather than just providing the metadata fields that are changing.

When system 100 executes a Replace action, one video is deleted and a new video is inserted. The statistics, such as views, and user-supplied information, such as comments and ratings, that are attached to the deleted video can be deleted during this process. In one embodiment, the statistics are not deleted if the new video has substantially similar content as the deleted video. Examples of the usage of the <action> element are shown below in the sample XML feed.

XML Tag Definitions for Content Feed Files

In one embodiment, system 100 content feed files can use tags from multiple XML schemas. The table below identifies the different exemplary schemas used in one embodiment of content feed files, the namespace prefix associated with each schema, and the namespace URL for each schema.

| Schema | Namespace Prefix | Schema URL |
|---|---|---|
| RSS | [None] Default namespace | None |
| Yahoo! Media RSS Module | media | http://search.yahoo.com/mrss/ |
| Content Host 100 XML Schema | yt | http://www.youtube.com/schemas/yt |

The following sections provide examples of the XML tags that appear in system 100 content feed files. Each of the following sections corresponds to an XML schema, and the tags in that section are listed alphabetically. Certain symbols may be displayed next to some subtags in the definitions below. These symbols, and their meanings, are:

?=optional subtag
\*=zero or more instances of the subtag
+=one or more instances of the subtag
|=Boolean OR RSS Tags rss Definition   The <rss> tag is the root element in an RSS file and encapsulates all data in a system 100 content feed.

-continued

| rss | | | |
|---|---|---|---|
| Attributes | Name | Format | Description |
| | version | Text | The version attribute specifies the RSS version to which the document conforms. |
| Example | <rss version="2.0" xmlns:media="http://search.yahoo.com/mrss" xmlns:yt="http://www.youtube.com/ schemas/yt/0.2"> | | |
| Subtags | Channel | | |
| Content Format | Container | | |

| channel | |
|---|---|
| Definition | The <channel> tag encapsulates information about the content feed file owner, followed by a series of items. Each item corresponds to a particular action that the content owner is performing on a particular video. |
| Example | <channel> |
| Subtags | yt:notification_email, yt:owner_name, |
| Subtag of | rss |
| Content Format | Container |

| item | |
|---|---|
| Definition | The <item> element encapsulates information about an action that can be performed for a particular video. |
| Subtags | media:content, media:title, yt:account?, yt:action, yt:advertising?, yt:community, yt:date_recorded?, yt:end_time?, yt:id?, yt:keep_fingerprint?, yt:language?, yt:location?, yt:movie_metadata \| yt:music_metadata \| yt:tv_metadata, yt:policy+, yt:start_time?, yt:target? |
| Subtag of | channel |
| Content Format | Container |

Tags Defined in Yahoo! Media Schema

| media:category | | | |
|---|---|---|---|
| Definition | The <media:category> tag specifies a genre that describes a video | | |
| Attributes | Name | Format | Description |
| | label | Text | The entity escaped name of the system 100 |
| | scheme | Text | This attribute specifies a URI that identifies |
| Example | <media:category label="Comedy" scheme="http://gdata.youtube.com/schemas/2007/categories. | | |
| Subtag of | media:content | | |
| Content Format | Text | | |

The following table identifies categories that may be used as the values of the <media:category> tag

| Value | Category |
|---|---|
| Animals | Pets & Animals |
| Autos | Autos & Vehicles |
| Comedy | Comedy |
| Education | Education |
| Entertainment | Entertainment |
| Events | Events & Weddings |
| Family | Family |
| Film | Films & Animation |

-continued

| | | |
|---|---|---|
| | ForSale | For Sale & Auctions |
| | Government | Nonprofit & Activism |
| | Howto | Howto & Style |
| | Humor | Humor |
| | Interests | Hobbies & Interests |
| | Music | Music |
| | News | News & Politics |
| | Odd | Odd & Outrageous |
| | People | People & Blogs |
| | Personals | Personals & Dating |
| | Science | Science & Technology |
| | ShortMovies | Short Movies |
| | Sports | Sports |
| | Travel | Travel & Events |
| | Videoblogging | Video blogging |

| media:content | | | |
|---|---|---|---|
| Definition | For insert and replace actions. The <media:content> tag provides a URL and various other types of information about a video. | | |
| Attributes | Name | Format | Description |
| | url | String | The url attribute identifies the file that contains the video content. |
| | fileSize | Integer | The fileSize attribute specifies the size, in bytes, of the file specified by the url attribute. |
| Example | <media:content url="file://987654321.avi" fileSize="1323320" medium="video"> | | |
| Subtags | media:category, media:description, media:keywords, media:rating?, media:restriction?, media:title | | |
| Subtag of | item | | |
| Content Format | Empty | | |

| media:description | | | |
|---|---|---|---|
| Definition | The <media:description> tag contains a summary or description of a video. The description can be sentence-based, rather than a list of keywords, and may be displayed in search results. | | |
| Attributes | Name | Format | Description |
| | type | String | The type attribute indicates the type of text provided in the tag value. Content feed files use plain text. |
| Example | <media:description type="plain">This video shows clips of the best goals from 50 years of professional football. </media:description> | | |
| Subtag of | media:content | | |
| Content Format | Text | | |

| media: keywords | |
|---|---|
| Definition | The <media:keywords> tag contains a list of words or phrases associated with a video. |
| Example | <media:keywords>football, sports, goals</media:keywords> |
| Subtag of | media:content |
| Content Format | Text |

| media:rating | |
|---|---|
| Definition | The <media:rating> tag specifies the audience for which the video is appropriate. The default content rating is nonadult. |

-continued media:rating

| Attributes | Name | Format | Description |
|---|---|---|---|
| | scheme | String | The scheme attribute identifies the rating schema used to classify the video. |
| Example | | | <media:rating scheme ="urn:simple">nonadult</media:rating> |
| Subtag of | | | media:content |
| Content Format | | | Complex | media:restriction

| | |
|---|---|
| Definition | The <media:restriction> tag specifies a list of one or more countries where playback of a video is either allowed or prohibited. If this element is not included, the video can be played in all countries.<br>The value for the <media:restriction> tag is a space-delimited list of ISO 3166 two-letter country codes. |

| Attributes | Name | Format | Description |
|---|---|---|---|
| | relationship | String | The relationship attribute indicates whether playback of a video is allowed or denied in the specified list of countries. Valid values for this attribute are allow and deny. |
| | type | String | The type attribute identifies the type of value specified by the <media:restriction> tag value. The only valid value for this attribute is country. |
| Example | | | <media:restriction relationship="deny" type="country">defr</media:restriction> |
| Subtag of | | | media:content |
| Content Format | | | Complex | media:title

| | |
|---|---|
| Definition | The <media:title> tag identifies the title of the video. |

| Attributes | Name | Format | Description |
|---|---|---|---|
| | type | Text | The type parameter specifies the type of text provided in the <media:title> tag's value. Content feeds require plain text format. |
| Example | | | <media:title type="plain">Top 50 Football Goals</media:title> |
| Subtag of | | | media:content |
| Content Format | | | Text |

Tags Defined in the Content Host 100 XML Schema yt:account

| | |
|---|---|
| Definition | A subtag of <channel>; as a subtag of <item>. The <yt:account> tag encapsulates information about a user account that is authorized to update or delete a video file.<br>As a subtag of <channel>, the <yt:account> tag contains the username and password for the default account that will be associated with all of the videos in the content feed file.<br>As a subtag of <item>, the <yt:account> tag specifies an additional user account that will be able to update a particular video in the content owner's feed. |
| Example | <yt:account> |
| Subtags | yt:username, yt:password? |
| Subtag of | channel, item |
| Content Format | Container | yt:action

| | |
|---|---|
| Definition | The <yt:action> tag indicates whether the content owner is inserting, updating, replacing or deleting a video file. The following list specifies valid values for this tag: | yt:action

| | |
|---|---|
| | Insert - This value indicates that the content owner is providing metadata for a new video.<br>Update - This value indicates that the content owner is modifying the metadata associated with a video without changing the video itself. When the content owner updates a video, the content owner includes the metadata fields that the content owner is updating.<br>Replace - This value indicates that the content owner is modifying the metadata associated with an existing video and that the content owner is also updating the video content. When processing this action, system 100 will delete the existing video and all of its metadata and then insert a new video with the metadata that the content owner provides for the action.<br>Delete - This value indicates that the content owner is removing an existing video from system 100's reference database. |
| Example | <yt:action>Insert<yt:action> |
| Subtag of | item |
| Content Format | Text | yt:syndication

| | |
|---|---|
| Definition | The <yt:syndication> flag, a subtag of <yt:distribution restriction>, sets the default policy on whether uploaded videos will be allowed to be used in the Content Distribution Channel network. Valid values are "Allow" and "Deny". The default value is "Allow." |
| Example | <yt:syndication>Allow</yt:syndication> |
| Subtag of | yt:distribution_restriction |
| Content Format | Boolean | yt:advertising

| | |
|---|---|
| Definition | The <yt:advertising> tag encapsulates information about allowable ad formats and features that may be applied to the video. |
| Example | <yt:advertising> |
| Subtags | yt:invideo |
| Subtag of | item |
| Content Format | Container | yt:album

| | |
|---|---|
| Definition | The <yt:album> tag specifies the title of the album that contains the song in a music video. This field is recommended for music videos. |
| Example | <yt:album>Funeral</yt:album> |
| Subtag of | yt:music metadata |
| Content Format | Text | yt:allow_comments

| | |
|---|---|
| Definition | The <yt:allow_comments> tag indicates whether system 100 will allow viewers to post comments about a video. The following list identifies valid values for this tag:<br>Always- Anyone may post comments that will be visible to other system 100 users.<br>Approve - Anyone may post comments about a video, but the content partner will use an approval process to determine which comments will be displayed to other system 100 users.<br>Never - Users are not allowed to post comments about the video.<br>*Note: system 100's default policy is to allow all users to post comments about a video. |

| yt:allow_comments | |
|---|---|
| Example | <yt:allow_comments>Approve</allow_comments> |
| Subtag of | yt:community |
| Content Format | Text |

| yt:allow_embedding | |
|---|---|
| Definition | The <yt:allow_embedding> tag indicates whether other system 100 users can include a particular video on their own web pages. Valid values for this field are true and false. The default value for this tag is true, which indicates that other users may embed the video on their own web pages. |
| Example | <yt:allow_ embedding >true<yt:allow_embedding> |
| Subtag of | yt:community |
| Content Format | Boolean |

| yt:allow_ratings | |
|---|---|
| Definition | The <yt:allow_ratings> tag indicates whether other system 100 users can rate a particular video. Valid values for this field are true and false. The default value for this tag is true, which indicates that users can rate the video. |
| Example | <yt:allow_ratings>true</allow_ratings> |
| Subtag of | yt:community |
| Content Format | Boolean |

| yt:allow_responses | |
|---|---|
| Definition | The <yt:allow_responses> tag indicates whether system 100 will allow viewers to post video responses to a video. Whereas the comments let other users provide textual feedback about a video, video responses allow other users to provide video feedback for the video. The following list identifies valid values for this tag:<br>Always - Anyone may post video responses that will be visible to other system 100 users.<br>Approve - Anyone may post video responses about a video, but the content partner will use an approval process to determine which video responses will be displayed to other system 100 users.<br>Never - Users are not allowed to post video responses to the video.<br>Note: system 100's default policy is to only make approved video responses visible to other system 100 users. |
| Example | <yt:allow_responses>always<yt:allow_responses> |
| Subtag of | yt:community |
| Content Format | Text |

| yt:artist | |
|---|---|
| Definition | The <yt:artist> tag specifies the music artist associated with a music video. This field is recommended for music videos. |
| Example | <yt:artist>The Arcade Fire</yt:artist> |
| Subtag of | yt:music metadata |
| Content Format | Text |

| yt:commercial | |
|---|---|
| Definition | The <yt:commercial> tag specifies the licensing policy for a video. There are two valid values for this field:<br>share - system 100 may use ads to generate revenue for the video, and that revenue would be shared with the partner according to the partner agreement.<br>free - The video will be freely available to other users.<br>The default value for this tag is share. |
| Example | <yt:commercial>share</commercial> |
| Subtag of | yt:policy |
| Content Format | Text |

| yt:community | |
|---|---|
| Definition | The <yt:community> tag encapsulates information about how other system 100 users can provide feedback about a video. This tag also contains a tag that indicates whether the video may be embedded on other web pages. |
| Example | <yt:community> |
| Subtags | yt:allow_comments?, yt:allow_embedding?, yt:allow_ratings?, yt:allow_responses? |
| Subtag of | item |
| Content Format | Container |

| yt:country | |
|---|---|
| Definition | The <yt:country> tag specifies the country where the video was recorded. This tag's value can be a two-letter ISO 3166 country code. |
| Example | <yt:country>DE</yt:country> |
| Subtag of | yt:location |
| Content Format | Text |

| yt:custom_id | |
|---|---|
| Definition | For movie and TV videos: The <yt:custom_id> tag contains a unique value that the content owner uses to identify a video. For example the <yt:custom_id> tag value could be an ISAN (International Standard Audiovisual Number) or a unique ID that the content owner created for the video.<br>The <yt:custom_id> tag is for movie and TV videos. For music videos, the content owner provide a value for either the <yt:custom_id>, <yt:grid> or <yt:isrc> tag. If the content owner does not provide an identifier for a video, the status report for the content owner's feed will contain Invalid | yt:custom_id

| | |
|---|---|
| | Claim as the status detail for that video. This status means that the video has been uploaded to the content owner's account but will remain private until the content owner manually provide an identifier or send an Update action for the video that contains the proper unique identifier. |
| Example | <yt:custom_id>000ABC123XYZ</yt:custom_id> |
| Subtag of | yt:movie_metadata, yt:music_metadata, yt:tv_metadata |
| Content Format | Text | yt:date_recorded

| | |
|---|---|
| Definition | The <yt:date_recorded> tag specifies the date that the video was recorded. |
| Example | <yt:date_recorded >2006-12-25</yt: date_recorded> |
| Subtag of | item |
| Content Format | Date (YYYY-MM-DD) | yt:distribution_restriction

| | |
|---|---|
| Definition | The <yt:distribution_restriction> tag encapsulates information about where system 100 videos can be distributed outside of the system 100 website and associated web page embeds. For instance, videos might be distributed to mobile phones or over broadcast television. |
| Example | <yt:distribution_restriction> |
| Subtags | yt:distribution_rule, yt:syndication |
| Subtag of | item |
| Content Format | Container | yt:distribution_rule

| | |
|---|---|
| Definition | As a subtag of <yt:distribution_restriction>, the <yt:distribution_rule> tag identifies the default distribution policy for all channels of distribution. Valid values are "Allow" and "Deny". The default value is "Allow." |
| Example | <yt:distribution_rule>Allow</yt: distribution_rule> |
| Subtag of | yt:distribution_restriction |
| Content Format | Boolean | yt:end_time

| | |
|---|---|
| Definition | The <yt:end_time> tag specifies the date and time after which a video will not be available on system 100. This field's value contains a date and time in ISO 8601 format. The value expresses times in UTC (Coordinated Universal Time). |
| Example | <yt:end_time>2007-12-31T14:25:00Z</yt:end_time> |
| Subtag of | item |
| Content Format | Date (YYYY-MM-DDThh:mm:ssZ) | yt:episode

| | |
|---|---|
| Definition | The <yt:episode> tag specifies the episode number associated with a TV video. System 100 allows the content owner to include this information if it is available for a video. |
| Example | <yt: episode >60</yt:episode> |
| Subtag of | yt:tv metadata |
| Content Format | Text |

| | yt:episode_title | |
|---|---|---|
| Definition | The <yt:episode_title> tag specifies the title of the episode associated with a TV video. System 100 allows the content owner to include this information if it is available for a video. | |
| Example | <yt:episode_title>The Junior Mint</yt:episode_title> | |
| Subtag of | yt:tv metadata | |
| Content Format | Text | |

| | yt:grid | |
|---|---|---|
| Definition | The <yt:grid> tag specifies the GRid (Global Release Identifier) of the music video. System 100 allows the content owner to include this information if it is available for a video. This field's value can contain 18 alphanumeric characters. In one embodiment for music videos, the content owner provide a value for either the <yt:custom_id>, <yt:grid> or <yt:isrc> tag. | |
| Example | <yt:grid>000abc123XYZ456jkf</yt:grid> | |
| Subtag of | yt:music_metadata | |
| Content Format | Text | |

| | yt:id | | |
|---|---|---|---|
| Definition | For update, replace and delete actions. The <yt:id> tag contains a value that uniquely identifies a video resource. | | |
| Attributes | Name | Format | Description |
| | type | Text | The type parameter specifies the type of identifier contained in the tag's value. The valid value for this attribute is video_id, which indicates that the tag value specifies a unique value that the content owner uses to identify a video. |
| Example | <yt:id type="video_id">abcxyz</yt:id> | | |
| Subtag of | item | | |
| Content Format | Complex | | |

| | yt:invideo | |
|---|---|---|
| Definition | The <yt:invideo> tag indicates whether a video is eligible for the advertising program. The advertising program includes an alternate viewing page format that displays an ad inside (or near) the video using a transparent Flash overlay. The page also displays a companion ad image. System 100 only checks the value of the <yt:invideo> tag if the content owner have specifically opted to participate in the InVideo Ads program. Valid values for this tag are Allow and Deny. The Default value is Allow. | |
| Example | <yt:invideo>Allow</yt:invideo> | |
| Subtag of | yt:advertising | |
| Content Format | Boolean | |

| | yt:isrc | |
|---|---|---|
| Definition | The <yt:isrc> tag specifies the ISRC (International Standard Recording Code) of the music video. System 100 allows the content owner to include this information if it is available for a video. This field's value contains exactly 12 alphanumeric characters. In one embodiment for music videos, the content owner provide a value for either the <yt:custom_id>, ><yt:grid> or <yt:isrc> tag. | |
| Example | <yt:isrc>000abc123XYZ</yt:isrc> | |
| Subtag of | yt:music_metadata | |
| Content Format | Text | | yt:keep_fingerprint

| | |
|---|---|
| Definition | The <yt:keep_fingerprint> tag indicates whether the video ID file for a video will remain active when that video is deleted. This tag is valid if the <yt:action> tag has a value of Delete.<br>Valid values for this tag are yes, which means the ID file will remain active, and no, which means the ID file will not remain active. The default value for this tag is no. |
| Example | <yt: keep_fingerprint>yes</yt: keep_fingerprint> |
| Subtag of | item |
| Content Format | Text | yt:label

| | |
|---|---|
| Definition | The <yt:label> tag identifies the record label that released the album containing the song in a music video. System 100 allows the content owner to include this information if it is available for a video. |
| Example | <yt:label>Merge Records</yt:label> |
| Subtag of | yt:music_metadata |
| Content Format | Text | yt:language

| | |
|---|---|
| Definition | The <yt:language> tag identifies the language of the video content. The table below lists the supported languages and their associated <yt:language> tag values. The default value for this tag is en, which indicates that the video content is in English. |

| Language | <yt:language> Tag Value |
|---|---|
| Chinese | zh |
| English | en |
| French | fr |
| German | de |
| Japanese | ja |
| Spanish | es |

| | |
|---|---|
| Example | <yt:language>en</yt:language> |
| Subtag of | Item |
| Content Format | Text | yt:location

| | |
|---|---|
| Definition | The <yt:location> tag encapsulates information about the geographic location where the video was recorded. |
| Example | <yt:location> |
| Subtags | yt:country?, yt:zip_code?, yt:location_text? |
| Subtag of | item |
| Content Format | Container | yt:location_text

| | |
|---|---|
| Definition | The <yt:location_text> tag identifies the place where the video was recorded. |
| Example | <yt:location_text>Hollywood, CA</yt:location> |
| Subtag of | yt:location |
| Content Format | Text | yt:movie_metadata

| | |
|---|---|
| Definition | For movie videos: The <yt:movie_metadata> tag encapsulates additional metadata fields about movie videos. In one embodiment, the <yt:movie_metadata> tag's subtags are used for identification and reporting purposes. |
| Example | <yt:movie_metadata> |
| Subtags | yt:custom_id, yt:title |
| Subtag of | item |
| Content Format | Container | yt:music_metadata

| | |
|---|---|
| Definition | For music videos: The <yt:music_metadata> tag encapsulates additional metadata fields about music videos. In one embodiment, the <yt:music_metadata> tag's subtags are only used for identification and reporting purposes. |
| Example | <yt:music_metadata> |
| Subtags | yt:custom_id I yt:isrc I yt:grid, yt:album?, yt:artist?, yt:song?, yt:label? |
| Subtag of | item |
| Content Format | Container | yt:notification_email

| | |
|---|---|
| Definition | The <yt:notification_email> tag contains a list of one or more email addresses to which system 100 will send a report about an uploaded content feed. Commas separate email addresses. |
| Example | <yt:notification_email>andy@example.com, smitty@example.com</yt:notification_email> |
| Subtag of | channel |
| Content Format | Text | yt:owner_name

| | |
|---|---|
| Definition | The <yt:owner_name> tag identifies the company or organization that owns the video content described in the content feed file. |
| Example | <yt:owner_name>Example.com TV</yt:owner_name> |
| Subtag of | channel |
| Content Format | Text | yt:password

| | |
|---|---|
| Definition | The <yt:password> tag specifies the password for a user account.<br>When the <yt:account> tag containing the <yt:password> tag is a subtag of <channel>, the <yt:password> tag value contains the password for the content owner's partner admin account. This allows the content owner's admin account to update, replace or delete any videos that the content owner uploads.<br>When the <yt:account> tag containing the <yt:password> tag is a subtag of <item>, the <yt: password> tag value contains the password for another system 100 user account that is authorized to update, replace or delete a particular video. |
| Example | <yt: password>w3dn3sday</yt: password> |
| Subtag of | yt:account |
| Content Format | Text |

| | yt:policy |
|---|---|
| Definition | The <yt:policy> tag encapsulates information about the licensing policies that apply to the video. |
| Example | <yt:policy> |
| Subtags | yt:commercial?, yt:ugc?, yt:territories? |
| Subtag of | item |
| Content Format | Container |

| | yt:season |
|---|---|
| Definition | The <yt:season> tag specifies the season number associated with a TV video. |
| Example | <yt:season>2</yt:season> |
| Subtag of | yt:tv_metadata |
| Content Format | Text |

| | yt:show_title |
|---|---|
| Definition | The <yt:show_title> tag specifies the TV show that is shown in a video. System 100 allows the content owner to include this information if it is available for a video. |
| Example | <yt:show_title>Seinfeld</yt:show_title> |
| Subtag of | yt:tv_metadata |
| Content Format | Text |

| | yt:song |
|---|---|
| Definition | The <yt:song> tag specifies the title of a song showcased in a music video. System 100 allows the content owner to include this information if it is available for a video. |
| Example | <yt:song>Rebellion (Lies)</yt:song> |
| Subtag of | yt:music_metadata |
| Content Format | Text |

| | yt:start_time |
|---|---|
| Definition | The <yt:start_time> tag specifies the date and time when system 100 will publicly release the video. This field's value contains a date and time in ISO 8601 format. The value expresses times in UTC (Coordinated Universal Time). If the action for the video is either Insert or Replace, and the content owner do not provide a start time for the video, the video will remain private in the content owner's account. The content owner provide a start time for a video to be publicly visible. To make a video public as soon as possible, use a date in the past as the start time for the video. |
| Example | <yt:start_time>2007-07-04T05:00:00Z</yt:start_time> |
| Subtag of | item |
| Content Format | Date (YYYY-MM-DDThh:mm:ssZ) |

| | yt:target |
|---|---|
| Definition | The <yt:target> tag specifies the actions that system 100 should perform for a video content resource. The following list identifies the set of valid actions: upload - Make the video publicly available on system 100. claim - Identify the video as content owned by the content feed file provider. System 100 will automatically claim (for the content owner's account) any content that the content owner uploads. fingerprint - Generate a video ID file for the content. System 100 generates a video ID file for each video that the content owner uploads. The valid values for this tag are upload, claim, fingerprint and claim, fingerprint. The default value for this tag is upload, claim, fingerprint. In one embodiment, if the content owner does not provide a value for this tag or if the content owner sets the value to upload, claim, fingerprint, the content owner's content will be visible on system 100. |
| Example | <yt:target>upload,claim,fingerprint</yt:target> |
| Subtag of | item |
| Content Format | Text |

| | yt:territories |
|---|---|
| Definition | The <yt:territories> tag identifies a list of one or more countries where the policies that the content owner defines for a video should or should not be applied. If the content owner does not provide this tag, then the policies that the content owner sets for a video will apply worldwide. If the content owner does provide this tag, the value of the rule attribute indicates whether the policies should (or should not) be applied in the |

-continued

| yt:territories | | | |
|---|---|---|---|
| | | | specified countries. The tag's value is a comma-delimited list of ISO 3166 two-letter country codes. (In one embodiment the country code for England is GB and not UK.)<br>The content owner can specify different policies for different countries by including multiple <yt:policy> tags for that video in the content owner's content feed, with each <yt:policy> tag defining the policies for specific territories. For example, the content owner could choose to monetize user-uploaded videos that match the content owner's video in the United States and to track views of user-uploaded videos matching the content owner's video everywhere else.<br>In one embodiment, if the content owner sets different policies for different countries, the content owner's feed will be invalid if it specifies more than one set of policies for the same video in a single country. For example, the content owner cannot monetize user-uploaded videos that match the content owner's video in the United States and track views of user- uploaded videos matching the same video everywhere except France since this would effectively create two policies for the same video in the United States. |
| | Name | Format | Description |
| Attributes | rule | Text | The rule attribute indicates whether the associated policies should or should not be applied in the specified territories. The valid values for this attribute are include and exclude.<br>If this attribute's value is include, then the associated policies will be applied in the specified territories.<br>If this attribute's value is exclude, then the associated policies will not be applied in the specified territories. |
| Example | Apply policy in the United States and Great Britain:<br><yt:territories rule="include">US, GB</yt:territories><br>Apply policy everywhere except Japan:<br><yt:territories rule="exclude">JP</yt:territories> | | |
| Subtag of | policy | | |
| Content Format | Text | | |

| yt:title | |
|---|---|
| Definition | The <yt:title> tag specifies the display title of a TV or movie video. This tag may have the same value as the <media:title> tag. |
| Example | <yt:title>Covert Operations II (Deluxe director's cut)</yt:title> |
| Subtag of | yt:movie_metadata, yt:tv_metadata |
| Content Format | Text |

| yt:tv_metadata | |
|---|---|
| Definition | For TV videos: The <yt:tv_metadata> tag encapsulates additional metadata fields about tv videos. In one embodiment the <yt:tv_metadata> tag's subtags are only used for identification and reporting purposes. |
| Example | <yt:tv_metadata> |
| Subtags | yt:custom_id, yt:show title?, yt:episode?, yt:episode_title?, yt:season? |
| Subtag of | item |
| Content Format | Container |

| yt:ugc | |
|---|---|
| Definition | For insert and replace actions: The <yt:ugc> tag specifies the action that system 100 will take if it detects that a user has uploaded a video that matches the content owner's copyright-protected video. The following list specifies valid values for this tag:<br>share - system 100 will include the user-uploaded video in the content owner's revenue-sharing agreement with system 100.<br>block - system 100 will block the user-uploaded file from appearing on system 100 in the territories that the content owner specifies.<br>research - system 100 will flag the user-uploaded video so that the content owner can track it. |
| Example | <yt:ugc>share</yt:ugc> |
| Subtag of | yt:policy |
| Content Format | Text |

| yt:username | |
|---|---|
| Definition | The <yt:username> tag specifies the username for a system 100 user account.<br>When the <yt:account> tag containing the <yt:username> tag is a subtag of <channel>, the <yt:username> tag value contains the username for the content owner's partner admin account. This allows the content owner's admin account to update, replace or delete any videos that the content owner uploads.<br>When the <yt:account> tag containing the <yt:username> tag is a subtag of <item>, the <yt:username> tag value contains the username for another system 100 user account that is authorized to update, replace or delete a particular video. |
| Example | <yt:username>happypartner</yt:username> |
| Subtag of | yt:account |
| Content Format | Complex |

| yt:zip_code | |
|---|---|
| Definition | The <yt:zip_code> tag identifies the zip code where a video was recorded. |
| Example | <yt:zip_code>94043</yt:zip_code> |
| Subtag of | yt:location |
| Content Format | Text |

Sample XML Feed

The XML samples below demonstrate how a content owner can insert, update, replace or delete videos in system 100 content feeds. One of ordinary skill in the art will understand that following is an exemplary format for content feed and the content feed can be provided in other formats.

The content feed file below contains four items, each of which demonstrates the XML structure for a different feed action. The different possible actions are discussed above with respect to the <yt:action> element. The example for updating a video also does not include a complete set of optional tags. In addition, the XML samples below are all for music videos.

```
<?xml version="1.0" encoding="UTF-8"?>
<rss version="2.0"
xmlns:media="http://search.yahoo.com/mrss"
xmlns:ch="http://www.youtube.com/schemas/ch/0.2">
<channel>
   <yt:notification_email>sandy@example.com,
   ben@example.com</yt:notification_email>
   <yt:account>
   <yt:username>happypartner</yt:username>
   <yt:password>thec0wg0esm00</yt:password>
   </yt:account>
   <yt:owner_name>example.comTV</yt:owner_name>
   <item>
   <yt:action>Insert</yt:action>
   <yt:account>
   <yt:username>little6pac</yt:username>
   <yt:password>yrdnual</yt:password>
   </yt:account>
   <media:title>Doin Laundry with my Mom. </media:title>
   <media:content url="file://987654321.avi" fileSize="1323320">
      <media:description type="plain"> Little 6-pac relives his
      childhood.</media:description>
      <media:keywords>little, 6-pac, laundry,
      mom</media:keywords>
      <media:category>Music</media:category>
      <media:rating scheme="urn:simple">adult</media:rating>
   </media:content>
   <yt:language>en</yt:language>
   <yt:date_recorded>2005-08-01</yt:date_recorded>
   <yt:location>
      <yt:country>US</yt:country>
      <yt:zip_code>90210</yt:zip_code>
      <yt:location_text>Beverly Hills, CA</yt:location_text>
   </yt:location>
   <yt:start_time>2007-07-07T07:07:07</yt:start_time>
   <yt:end_time>2007-12-31T00:00:00</yt:end_time>
   <yt:community>
      <yt:allow_comments>Always</yt:allow_comments>
      <yt:allow_responses>Never</yt:allow_responses>
      <yt:allow_ratings>false</yt:allow_ratings>
      <yt:allow_embedding>false</yt:allow_embedding>
   </yt:community>
   <yt:policy>
      <yt:commercial>share</yt:commercial>
      <yt:ugc>share</yt:ugc>
   </yt:policy>
   <yt:music_metadata>
      <yt:isrc>USLE10673202</yt:isrc>
      <yt:grid>A10302300042344407</yt:grid>
      <yt:custom_id>000ABC123XYZ</yt:custom_id>
      <yt:artist>Lil 6-pac</yt:artist>
      <yt:song>Doin' Laundry with my Mom.</yt:song>
      <yt:album>Bein' Lil' in NY</yt:album>
      <yt:label>Mama's Boy Records</yt:label>
   </yt:music_metadata>
   <yt:distribution_restriction>
      <yt:distribution_rule>Allow</yt:distribution_rule>
      <yt:syndication>Allow</yt:syndication>
   </yt:distribution_restriction>
   <yt:advertising>
      <yt:invideo>Allow</yt:invideo>
   </yt:advertising>
   <yt:target>upload,claim,fingerprint</yt:target>
   <yt:keep_fingerprint>no</yt:keep_fingerprint>
   </item>
   <item>
   <yt:action>Update</yt:action>
   <yt:id type="video_id">asd92n30</yt:id>
   <media:title>Twinkle, Twinkle Little Star</media:title>
   <media:content url="">
      <media:keywords>twinkle, star, placido,
      pavarotti</media:keywords>
   </media:content>
   <yt:language>en</yt:language>
   <yt:date_recorded>2004-03-15</yt:date_recorded>
   <yt:location>
      <yt:country>US</yt:country>
      <yt:zip_code>90210</yt:zip_code>
      <yt:location_text>Beverly Hills, CA</yt:location_text>
   </yt:location>
   <yt:community>
      <yt:allow_comments>Always</yt:allow_comments>
      <yt:allow_responses>Never</yt:allow_responses>
      <yt:allow_ratings>false</yt:allow_ratings>
      <yt:allow_embedding>false</yt:allow_embedding>
   </yt:community>
   <yt:policy>
      <yt:commercial>share</yt:commercial>
      <yt:ugc>share</yt:ugc>
   </yt:policy>
   <yt:music_metadata>
      <yt:label>Kid Songs Inc.</yt:label>
   </yt:music_metadata>
   <yt:distribution_restriction>
```

-continued

```
    <yt:distribution_rule>Allow</yt:distribution_rule>
    <yt:syndication>Allow</yt:syndication>
  </yt:distribution_restriction>
</item>
<item>
<yt:action>Replace</yt:action>
<yt:id type="video_id">g92df3km2</yt:id>
<yt:account>
    <yt:username>little6pac</yt:username>
    <yt:password>yrdnual</yt:password>
</yt:account>
<media:title>1812 Sheep</media:title>
<media:content url="file://1812_sheep.avi" fileSize="1323320">
    <media:description type="plain"> Sheep bleat the 1812
    Overture.
    </media:description>
    <media:keywords>1812, overture, sheep</media:keywords>
    <media:category>Music</media:category>
    <media:rating scheme="urn:simple">nonadult</media:rating>
</media:content>
<yt:language>en</yt:language>
<yt:date_recorded>2004-10-18</yt:date_recorded>
<yt:location>
    <yt:country>US</yt:country>
    <yt:zip_code>90210</yt:zip_code>
    <yt:location_text>Beverly Hills, CA</yt:location_text>
</yt:location>
<yt:community>
    <yt:allow_comments>Always</yt:allow_comments>
    <yt:allow_responses>Never</yt:allow_responses>
    <yt:allow_ratings>false</yt:allow_ratings>
    <yt:allow_embedding>false</yt:allow_embedding>
</yt:community>
<yt:policy>
    <yt:commercial>share</yt:commercial>
    <yt:ugc>share</yt:ugc>
</yt:policy>
<yt:music_metadata>
    <yt:isrc>USPD10267302</yt:isrc>
    <yt:grid>A10202301032445467</yt:grid>
    <yt:custom_id>000ABC123XYZ</yt:custom_id>
    <yt:artist>Farmer Bob's Sheep</yt:artist>
    <yt:song>1812 Overture</yt:song>
    <yt:album>Farm Animal Classics</yt:album>
    <yt:label>Mad Cow Productions</yt:label>
</yt:music_metadata>
<yt:distribution_restriction>
    <yt:distribution_rule>Allow</yt:distribution_rule>
    <yt:syndication>Allow</yt:syndication>
</yt:distribution_restriction>
</item>
<item>
    <yt:action>Delete</yt:action>
    <yt:id type="video_id">z84kf03j5g</yt:id>
</item>
</channel>
</rss>
```

Appendix A contains additional XML samples for movie videos and TV videos. The examples for updating movie and TV videos can include a complete set of optional tags.

Status Reports for Uploaded Content Feeds

After processing each of the content owner's XML feeds, system 100 posts a status report detailing the actions taken for each item in that feed. The report can be named status-xml-filename, where xml-filename is the filename of content owner's XML feed. The status report can be placed on SFTP server 1246 in the same directory as the content feed file.

The <channel_status> tag is the root XML element in a status report. The <channel_status> tag contains one <item_status> tag that indicates whether system 100 successfully processed the content feed file. It also contains one <item_status> tag for each item in content feed file. Within the <item_status> tag, the <command> tag identifies the action that system 100 executed. If the value of the <command> tag is Parse, then the <item_status> tag contains information about how system 100 processed content owner's XML feed. Otherwise, the <item_status> tag contains information about an insert, update, replace or delete action requested in content owner's XML feed. If system 100 successfully executes the action that the content owner requests in the content feed file, the <item_status> tag contains a <status> tag with the value Success. If system 100 does not successfully execute the action that the content owner requests in the content feed file, the <item_status> tag will contain a <status> tag with the value Failure and a <status_detail> tag that contains additional information about the reason that the operation failed. System 100 can assign a video ID to each new video that the content owner inserts. The status report will specify this ID, and the content owner will need to provide that ID in later requests to update, replace or delete that video.

Sample XML for Status Report

The XML sample below shows an exemplary structure of the status reports that system 100 can return when the content owner posts a content feed. The status report contains entries for five feed items. In the XML, there are comments to indicate the separation of <item_status> tags for different feed items. The first <item_status> tag indicates that system 100 successfully processed the XML feed. The second <item_status> tag indicates that a request to insert a video failed; the remaining four entries indicate that requests to insert, update, replace and delete videos were successful. The comments in the example, which would not appear in an actual status report, use the following syntax:

```
<!-- Status for successful replace action begins here -->
<?xml version="1.0" encoding="UTF-8"?> <channel_status
version="2"> <timestamp>1162434848.49</timestamp>
<uploader_name>content owner dropbox account</uploader_name>
    <!-- Status for processing the XML feed begins here -->
    <item_status version="2">
        <timestamp>1162437914</timestamp>
        <action>
            <command>Parse</command>
            <status>Success</status>
                <status_detail />
        </action>
            <metadata_file>your_file.xml</metadata_file>
        </item_status>
        <!-- Status for failed insert action begins here -->
        <item_status version="2">
        <timestamp>1162434262</timestamp> <action>
        <command>Submit</command> <status>Failure</status>
        <status_detail>Can't find video file</status_detail>
        </action>
        <video_file>co2_file.mov</video_file>
        <filename>co2_file.mov</filename>
        <custom_id>000ABC123XYZ</custom_id>
        <title>Covert Operations II</title>
        </item_status>
        <!-- Status for successful insert action begins here -->
        <item_status version="2">
        <timestamp>1162434262</timestamp>
        <action>
        <command>Insert</command>
        <status>Success</status> </action>
        <video_file>co2_file.mov</video_file>
        <filename>co2_file.mov</filename>
        <custom_id>000ABC123XYZ</custom_id>
        <title>Covert Operations II</title>
    </item_status>
    <!-- Status for successful update action begins here -->
<item_status version="2">
<timestamp>1162434258</timestamp> <action>
<command>Update</command>
    <status>Success</status>
</action> <id
type="video_id">a2jd010</id>
```

```
<title>Extreme Knitting with Granny Jones</title>
  </item_status>
    <!-- Status for successful replace action begins here -->
  <item_status version="2"> <timestamp>1162434258</timestamp>
  <action> <command>Replace</command>
    <status>Success</status>
  </action> <id
type="video_id">asd92n30</id>
  <isrc>USREV0124523</isrc>
  <custom_id>2307411</custom_id>
  <title>WOOHOO</title>
  </item_status>
    <!-- Status for successful delete action begins here -->
  <item_status version="2">
  <timestamp>1162434258</timestamp> <action>
  <command>Delete</command>
    <status>Success</status>
  </action> <id
type="video_id">k302t034</id>
  <isrc>USREV0500005</isrc>
  <custom_id>5607411</custom_id>
  <title>Unicorns Are Ugly</title>
  </item_status>
  </channel_status>
```

XML Tao Definitions for Status Reports

The following tables define the XML tags that may appear in the status report that system 100 posts after processing content feed file. The tags are listed in alphabetical order.

| action | |
|---|---|
| Definition | The <action> tag contains information about the type of action described by the content of an <item status> tag as well as an indication of whether the action was successful |
| Example | <action> |
| Subtags | command, description, status, status_detail? |
| Subtag of | Item_status |
| Content Format | Container |

| channel status | |
|---|---|
| Definition | The <channel status> tag is the root element in a status report that explains how system 100 process an XML feed. |
| Example | <channel status> |
| Subtags | timestamp, uploader_name, item_status? |
| Content Format | Container |

| command | |
|---|---|
| Definition | The <command> tag specifies the type of action that system 100 executed. This tag has five possible values - Parse, Insert, Update, Replace and Delete. The <item-status> tag that contains the Parse command indicates whether system 100 successfully processed the content owner's XML feed. Each successive <item-status> tag specifies one of the four remaining actions, each of which corresponds to a possible value of the <vt:action> tag in content owner's XML feed. |
| Example | <command>Update</command> |
| Subtags | action |
| Content Format | Text |

| custom_id | |
|---|---|
| Definition | The <custom_id> tag contains a unique value that the content owner uses to identify a video. The <custom_id> tag for an item in the status report will contain the same value as the <vt:custom_id> tag in content owner's feed. This value is returned in the status report to help content owner match the returned status to the proper video. |
| Example | <custom_id>000ABC123XYZ<custom_id> |
| Subtags | Item_status |
| Content Format | Text |

| description | |
|---|---|
| Definition | The <description> tag contains additional information about the action that system 100 performed. (The <command> tag identifies this action.) |
| Example | <description>Update a video</description> |
| Subtags | Action |
| Content Format | Text |

| filename | |
|---|---|
| Definition | The <filename> tag specifies the file that contains the actual content for a video. The <filename> tag for an item in the status report will have the same value as the <media:content> tag's url attribute for the same item in the content owner's feed. Note: This field is returned if the content owner is inserting or replacing a video. |
| Example | <filename>co2_file.mov<filename> |
| Subtags | Item_status |
| Content Format | Text |

| grid | |
|---|---|
| Definition | The <grid> tag contains the Grid (Global Release Identifier) of the music video. The <grid> tag for an item in the status report contains the same value as the <vt:gird> tag in content owner's feed. This value is returned in the status report to help the content owner match the returned status to the proper video. |
| Example | <grid>co2_file.mov<filename> |
| Subtags | Item_status |
| Content Format | Text |

| id | | | |
|---|---|---|---|
| Definition | The <id> tag specifies the unique ID that system 100 assigns to content owner's video. This value is particularly important for a video that the content owner has just inserted since the content owner will use the newly assigned <video_id> to update, replace or delete the corresponding video. | | |
| Attributes | Name | Format | Description |
| | type | Text | The type parameter specifies the type of identifier contained in the tag's |

-continued

| id | |
|---|---|
| | value. A valid value for this attribute is video_id, which indicates that the tag value specifies a unique value that the content owner uses to identify a video. |
| Example | <id type="video_id">a2jdj010</id> |
| Subtags | Item_status |
| Content Format | Text |

| isrc | |
|---|---|
| Definition | The <isrc> tag contains the ISRC (International Standard Recording Code) assigned to the video. The <isrc> tag for an item in the status report will contain the same value as the <yt:isrc> tag in content owner's feed. This value is returned in the status report to help content owner match the returned status to the proper video. |
| Example | <isrc>000abc123XYZ<isrc> |
| Subtags | Item_status |
| Content Format | Text |

| item_status | |
|---|---|
| Definition | The <item_status> tag contains information about an action requested in content owner's feed. |
| Example | <item_status> |
| Subtags | timestamp, action, custom_id?, grid?, id, isrc?, metadata_file?, title, video_file?, filename? |
| Content Format | Container |

| metadata_file | |
|---|---|
| Definition | The <metadata_file> tag identifies the XML feed for which the status report provides information. |
| Example | <metadata_file>your_file_10312007.xml</metadata_file> |
| Subtag of | item status |
| Content Format | String |

| status | |
|---|---|
| Definition | The <status> tag indicates whether system 100 successfully completed a requested action. Possible values for this tag are Success and Failure. |
| Example | <status>Success</status> |
| Subtag of | action |
| Content Format | Text | status_detail

| | |
|---|---|
| Definition | The <status> tag explains why system 100 was unable to complete a requested action. |
| Example | <status_detail>Cannot find video file</status_detail> |
| Subtag of | action |
| Content Format | Text | timestamp

| | |
|---|---|
| Definition | As a subtag of <channel status>, <timestamp> tag indicates the time that system 100 finished processing an entire feed. As a subtag of <item status>, the <timestamp> tag indicates the time that system 100 finished an individual item in the feed. |
| Example | <timestamp>1162434848</timestamp> |
| Subtag of | channel_status, time status |
| Content Format | Text | title

| | |
|---|---|
| Definition | The <title> tag specifies the title that system 100 displays for the video. This title displays in a Content Manager, which allows the content owners to monitor their content. If their video is visible to the public, this title will also display on content provider's public website. The <title> tag for an item in the status report contain the same value as the <yt:title> tag in content owner's feed. |
| Example | <title>Covert Operations II</title> |
| Subtag of | item status |
| Content Format | Text | uploader_name

| | |
|---|---|
| Definition | The <uploader_name> tag contains a human-readable name assigned to content owner's SFTP dropbox. The content owner is assigned this tag by system 100. The content owner does not need to process the value in this tag. |
| Example | <uploader_name>Content owner's SFTP dropbox</uploader_name> |
| Subtag of | channel_status |
| Content Format | String | video_file

| | |
|---|---|
| Definition | The <video_file> tag specifies the file that contains the actual content for a video. The <video_file> tag for an item in the status report will have the same value as the <media:content> tag's url attribute for the same item in content owner's feed. This field is returned if the content owner is inserting or replacing a video. |
| Example | <video_file>co2_file.mov</video_file> |
| Subtag of | item_status |
| Content Format | Text | video_id

| | |
|---|---|
| Definition | <video_id> tag specifies the unique ID that system 100 assigns to the content owner's video. This value is particularly important for a video that the content owner has just inserted because the content owner uses the newly |

| video_id |
|---|
| assigned <video_id> to update, replace or delete the corresponding video at some point in the future. |

| | |
|---|---|
| Example | <video_id>a2jdj010</video_id> |
| Subtag of | item status |
| Content Format | Text |

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component. For example, the particular functions of content owner interface 126, content directory 127, and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the actions and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Additionally, the reference content may include audio, video, a combination of audio and video, or still images. For ease of description, many examples illustrated below assume that the reference content is video; those of skill in the art will appreciate that audio, audio combined with video, and still images can be received, identified, and acted upon in a similar way as described above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

Appendix A—Additional Content Feed Files Examples

The following sections contain sample XML feeds for movie videos and TV videos. The Sample XML Feeds section, which appears earlier in this document, contains sample XML feeds for music videos. The XML for different feed types is virtually identical. The primary difference between the samples is in the use of the <yt:movie_metadata>, <yt:music_metadata> and <yt:tv_metadata>tags, which contain metadata about a particular type of video.

XML Examples for Movie Videos

```
<?xml version="1.0" encoding="UTF-8"?>
<rss version="2.0"
xmlns:media="http://search.yahoo.com/mrss"
xmlns:ch="http://www.youtube.com/schemas/ch/0.2">
<channel>
<yt:notification_email>sandy@example.com,
ben@example.com</yt:notification_email>
<yt:account>
<yt:username>happypartner</yt:username>
<yt:password>thec0wg0esm00</yt:password>
</yt:account>
             <yt:owner_name>example.com TV</yt:owner_name>
<item>
<yt:action>Insert</yt:action>
<yt:account>
<yt:username>little6pac</yt:username>
<yt:password>yrdnual</yt:password>
</yt:account>
<media:title>Covert Operations II</media:title>
<media:content url="file://co2_file.mov" fileSize="12216320">
<media:description type="plain">
Ms. World reveals world domination plans.
</media:description>
<media:keywords>covert, operations, spy, pagent</media:keywords>
<media:category>Entertainment</media:category>
<media:rating scheme="urn:simple">nonadult</media:rating>
</media:content>
<yt:language>en</yt:language>
<yt:date_recorded>2005-08-01</yt:date_recorded>
<yt:location>
<yt:country>US</yt:country>
<yt:zip_code>90210</yt:zip_code>
<yt:location_text>Beverly Hills, CA</yt:location_text>
</yt:location>
yt:start_time>2007-07-07T07:07:07</yt:start_time>
<yt:end_time>2007-12-31T00:00:00</yt:end_time>
<yt:community>
<yt:allow_comments>Always</yt:allow_comments>
<yt:allow_responses>Never</yt:allow_responses>
<yt:allow_ratings>false</yt:allow_ratings>
<yt:allow_embedding>false</yt:allow_embedding>
</yt:community>
<yt:policy>
<yt:commercial>share</yt:commercial>
<yt:ugc>share</yt:ugc>
</yt:policy>
<yt:movie_metadata>
<yt:custom_id>000ABC123XYZ</yt:custom_id>
<yt:title>Covert Operations II
(Deluxe extended director's cut)</yt:title>
</yt:movie_metadata>
<yt:distribution_restriction>
<yt:distribution_rule>Allow</yt:distribution_rule>
<yt:syndication>Allow</yt:syndication>
</yt:distribution_restriction>
<yt:advertising>
```

XML Examples for Movie Videos (continued)

```
<yt:invideo>Allow</yt:invideo>
</yt:advertising>
<yt:target>upload,claim,fingerprint</yt:target>
<yt:keep_fingerprint>no</yt:keep_fingerprint>
</item>
<item>
<yt:action>Update</yt:action> <yt:id
type="video_id">asd92n30</yt:id>
<media:title>Under the Rainbow</media:title>
<media:content url="">
<media:description type="plain">
Documentary of the Wizard's iron-fisted rule in Oz.
</media:description>
<media:keywords>oz, wizard, regime,
oppression</media:keywords>
<media:category>Entertainment</media:category>
<media:rating scheme="urn:simple">adult</media:rating>
</media:content>
<yt:language>en</yt:language>
<yt:date_recorded>2004-03-15</yt:date_recorded>
<yt:location>
<yt:country>US</yt:country>
<yt:zip_code>90210</yt:zip_code>
<yt:location_text>Beverly Hills, CA</yt:location_text>
</yt:location>
<yt:community>
<yt:allow_comments>Always</yt:allow_comments>
<yt:allow_responses>Never</yt:allow_responses>
<yt:allow_ratings>false</yt:allow_ratings>
<yt:allow_embedding>false</yt:allow_embedding>
</yt:community>
<yt:policy>
<yt:commercial>share</yt:commercial>
<yt:ugc>share</yt:ugc>
</yt:policy>
<yt:movie_metadata>
<yt:custom_id>000ABC123XYZ</yt:custom_id>
<yt:title>Under the Rainbow</yt:title>
</yt:movie_metadata>
<yt:distribution_restriction>
<yt:distribution_rule>Allow</yt:distribution_rule>
<yt:syndication>Allow</yt:syndication>
</yt:distribution_restriction>
</item>
<item>
<yt:action>Replace</yt:action>
<yt:id type="video_id">g92df3km2</yt:id>
<media:title>Alpha Squad 7: Lady Nocturne:
A Tek Jansen Adventure</media:title>
<media:content url="file://tek_jansen_updated.mp2"
fileSize="14296127">
<media:description type="plain">
```

```
</media:description>
<media:keywords>tek, jansen, lady, noctume</media:keywords>
<media:category>Entertainment</media:category>
<media:rating scheme="urn:simple">nonadult</media:rating>
</media:content>
<yt:language>en</yt:language>
<yt:date_recorded>2004-10-18</yt:date_recorded>
<yt:location>
<yt:country>US</yt:country>
<yt:zip_code>90210</yt:zip_code>
<yt:location_text>Beverly Hills, CA</yt:location_text>
</yt:location>
<yt:community>
<yt:allow_comments>Always</yt:allow_comments>
<yt:allow_responses>Never</yt:allow_responses>
<yt:allow_ratings>false</yt:allow_ratings>
<yt:allow_embedding>false</yt:allow_embedding>
</yt:community>
<yt:policy>
```

```
            <yt:commercial>share</yt:commercial>
            <yt:ugc>share</yt:ugc>
            </yt:policy>
            <yt:movie_metadata>
            <yt:title>Alpha Squad 7: Lady Nocturne: A Tek Jansen Adventure</yt:title>
            </yt:movie_metadata>
            <yt:distribution_restriction>
            <yt:distribution_rule>Allow</yt:distribution_rule>
            <yt:syndication>Allow</yt:syndication>
            </yt:distribution_restriction>
            </item>
            <item>
            <yt:action>Delete</yt:action>
            <yt:id type="video_id">z84kf03j5g</yt:id>
            </item>
            </channel>
            </rss>
```

XML Examples for TV Videos

```
<?xml version="1.0" encoding="UTF-8"?>
<rss version="2.0"
xmlns:media="http://search.yahoo.com/mrss"
xmlns:ch="http://www.youtube.com/schemas/ch/0.2">
<channel>
<yt:notification_email>sandy@example.com, ben@example.com</yt:notification_email>
<yt:account>
<yt:username>happypartner</yt:username>
<yt:password>thec0wg0esm00</yt:password>
</yt:account>
   <yt:owner_name>example.com TV</yt:owner_name>
<item>
<yt:action>Insert</yt:action>
<media:title>Extreme Knitting with Granny Jones: Holiday Sweaters</media:title>
<media:content url="file://extreme_knitting.mov" fileSize="892405865">
<media:description type="plain">
Granny Jones knits a wool sweater!
</media:description>
<media:keywords>knitting, extreme, granny, jones </media:keywords>
<media:category>Entertainment</media:category>
<media:rating scheme="urn:simple">adult</media:rating>
</media:content>
<yt:language>en</yt:language>
<yt:date_recorded>2005-08-01</yt:date_recorded>
<yt:location>
<yt:country>US</yt:country>
<yt:zip_code>90210</yt:zip_code>
<yt:location_text>Beverly Hills, CA</yt:location_text>
</yt:location>
<yt:start_time>2007-07-07T07:07:07</yt:start_time>
<yt:end_time>2007-12-31T00:00:00</yt:end_time>
<yt:community>
<yt:allow_comments>Always</yt:allow_comments>
<yt:allow_responses>Never</yt:allow_responses>
<yt:allow_ratings>false</yt:allow_ratings>
<yt:allow_embedding>false</yt:allow_embedding>
</yt:community>
<yt:policy>
<yt:commercial>share</yt:commercial>
<yt:ugc>share</yt:ugc>
</yt:policy>
<yt:tv_metadata>
<yt:custom_id>gj_0308</yt:custom_id>
<yt:episode_title>Holiday Sweaters</yt:episode_title>
<yt:show_title>Extreme Knitting with Granny Jones</yt:show_title>
<yt:episode>3</yt:episode>
<yt:season>8</yt:season>
</yt:tv_metadata>
<yt:distribution_restriction>
<yt:distribution_rule>Allow</yt:distribution_rule>
<yt:syndication>Allow</yt:syndication>
</yt:distribution_restriction>
<yt:advertising>
<yt:invideo>Allow</yt:invideo>
</yt:advertising>
<yt:target>upload,claim,fingerprint</yt:target>
```

```
<yt:keep_fingerprint>no</yt:keep_fingerprint>
</item>
<item>
<yt:action>Update</yt:action>
<yt:id type="video_id">asd92n30</yt:id>
<media:title>When Poodles Attack!</media:title>
<media:content url="">
<media:description type="plain">
KILLER poodles are on the loose!
</media:description>
<media:keywords>killer, pets, poodle, attack</media:keywords>
<media:category>Entertainment</media:category>
<media:rating scheme="urn:simple">adult</media:rating>
</media:content>
<yt:language>en</yt:language>
<yt:date_recorded>2004-03-15</yt:date_recorded>
<yt:location>
<yt:country>US</yt:country>
<yt:zip_code>90210</yt:zip_code>
<yt:location_text>Beverly Hills, CA</yt:location_text>
</yt:location>
<yt:community>
<yt:allow_comments>Always</yt:allow_comments>
<yt:allow_responses>Never</yt:allow_responses>
<yt:allow_ratings>false</yt:allow_ratings>
<yt:allow_embedding>false</yt:allow_embedding>
</yt:community>
<yt:policy>
<yt:commercial>share</yt:commercial>
<yt:ugc>share</yt:ugc>
</yt:policy>
<yt:tv_metadata>
<yt:show_title>When Poodles Attack!</yt:show_title>
</yt:tv_metadata>
<yt:distribution_restriction>
<yt:distribution_rule>Allow</yt:distribution_rule>
<yt:syndication>Allow</yt:syndication>
</yt:distribution_restriction>
</item>
<item>
<yt:action>Replace</yt:action>
<yt:id type="video_id">g92df3km2</yt:id>
<media:title>Cooking with Mary Ann Cotton: Killer Holiday Feasts</media:title>
<media:content url="file://cooking_1252.mov" fileSize="1596833065">
<media:description type="plain">
Mary makes a killer holiday feast.
</media:description>
<media:keywords>mary, cotton, cooking, feast</media:keywords>
<media:category>Entertainment</media:category>
<media:rating scheme="urn:simple">nonadult</media:rating>
</media:content>
<yt:language>en</yt:language>
<yt:date_recorded>2004-10-18</yt:date_recorded>
<yt:location>
<yt:country>US</yt:country>
<yt:zip_code>90210</yt:zip_code>
<yt:location_text>Beverly Hills, CA</yt:location_text>
</yt:location>
<yt:community>
<yt:allow_comments>Always</yt:allow_comments>
<yt:allow_responses>Never</yt:allow_responses>
<yt:allow_ratings>false</yt:allow_ratings>
<yt:allow_embedding>false</yt:allow_embedding>
</yt:community>
<yt:policy>
<yt:commercial>share</yt:commercial>
<yt:ugc>share</yt:ugc>
</yt:policy>
<yt:tv_metadata>
<yt:custom_id>1252</yt:custom_id>
<yt:episode_title>Killer Holiday Feasts</yt:episode_title>
<yt:show_title>Cooking with Mary Ann Cotton</yt:show_title>
<yt:episode>5</yt:episode>
<yt:season>2</yt:season>
</yt:tv_metadata>
<yt:distribution_restriction>
<yt:distribution_rule>Allow</yt:distribution_rule>
<yt:syndication>Allow</yt:syndication>
</yt:distribution_restriction>
</item>
<item>
<yt:action>Delete</yt:action>
<yt:id type="video_id">z84kf03j5g</yt:id>
</item>
</channel>
</rss>
```

What is claimed is:

1. A method for processing content files, the method comprising:
 receiving, at a server from a first device, a plurality of content items from a content owner;
 identifying a policy associated with each content item from the plurality of content items, the policy specifying an action that a content host is to perform on other content items that match the content item;
 determining that a second content item that is not one of the plurality of content items matches a first content item from the plurality of content items based on comparing the second content item to a plurality of audio fingerprints that each correspond to a respective one of the plurality of content items; and responsive to determining that the second content item that is not one of the plurality of content items matches a first content item from the plurality of content items, applying, by the content host, the identified policy associated with the first content item to the second content item by performing the action specified by the policy.

2. The method of claim 1, further comprising receiving a content feed file from the content owner that includes, for each content item from the plurality of content items, one or more policies for the content host to manage each content item from the plurality of content items on a content platform.

3. The method of claim 2, further comprising parsing the received content feed file to identify the policy associated with each content item from the plurality of content items.

4. The method of claim 2, wherein the content feed file further comprises a metadata description of each content item from the plurality of content items, the metadata description including the one or more policies for the content host to manage each content item from the plurality of content items on the content platform.

5. The method of claim 2, wherein the first content item includes the content feed file received from the content owner for the first content item, wherein the content feed file includes a metadata description of the first content item and the policy.

6. The method of claim 2, wherein the policy indicates that the content feed file includes modified metadata for the second content item.

7. The method of claim 2, wherein the content feed file comprises an extensible markup language (XML) file containing XML tags that define the one or more policies for managing each content item from the plurality of content items and wherein the content feed file is parsed by parsing the XML tags to determine the policy specifying the action that the content host is to perform on other content items that match the first content item.

8. The method of claim 1, wherein the policy indicates monetization options for the second content item that matches the first content item.

9. The method of claim 1, wherein the policy indicates a request to delete the second content item in response to determining that the second content item matches the first content item.

10. The method of claim 1, further comprising determining that the second content item is received at the server hosting the first content item from a source different than a content owner of the first content item.

11. The method of claim 1, further comprising generating a media identifier for the first content item, wherein generating the media identifier includes creating a frame-by frame video signature of the first content item.

12. The method of claim 11, further comprising determining whether the second content item matches the first content item by comparing the frame-by-frame video signature of the first content item to the second content item.

13. The method of claim 1, wherein each of the plurality of audio fingerprints corresponds to unique audio features of a respective content item the plurality of content items.

14. A system for processing content files, the system comprising:

a hardware processor that is configured to:

receive, at a server from a first device, a plurality of content items from a content owner;

identify a policy associated with each content item from the plurality of content items, the policy specifying an action that a content host is to perform on other content items that match the content item;

determine that a second content item that is not one of the plurality of content items matches a first content item from the plurality of content items based on comparing the second content item to a plurality of audio fingerprints that each correspond to a respective one of the plurality of content items; and responsive to determining that the second content item that is not one of the plurality of content items matches a first content item from the plurality of content items, apply, by the content host, the identified policy associated with the first content item to the second content item by performing the action specified by the policy.

15. The system of claim 14, wherein the hardware processor is further configured to receive a content feed file from the content owner that includes, for each content item from the plurality of content items, one or more policies for the content host to manage each content item from the plurality of content items on a content platform.

16. The system of claim 15, further comprising parsing the received content feed file to identify the policy associated with each content item from the plurality of content items.

17. The system of claim 15, wherein the content feed file further comprises a metadata description of each content item from the plurality of content items, the metadata description including the one or more policies for the content host to manage each content item from the plurality of content items on the content platform.

18. The system of claim 15, wherein the first content item includes the content feed file received from the content owner for the first content item, wherein the content feed file includes a metadata description of the first content item and the policy.

19. The system of claim 14, wherein the hardware processor is further configured to determine that the second content item is received at the server hosting the first content item from a source different than a content owner of the first content item.

20. A non-transitory computer-readable medium containing computer executable instructions that, when executed by a processor, cause the processor to perform a method for processing content files, the method comprising:

receiving, at a server from a first device, a plurality of content items from a content owner;

identifying a policy associated with each content item from the plurality of content items, the policy specifying an action that a content host is to perform on other content items that match the content item;

determining that a second content item that is not one of the plurality of content items matches a first content item from the plurality of content items based on comparing the second content item to a plurality of audio fingerprints that each correspond to a respective one of the plurality of content items; and responsive to determining that the second content item that is not one of the plurality of content items matches a first content item from the plurality of content items, applying, by the content host, the identified policy associated with the first content item to the second content item by performing the action specified by the policy.

\* \* \* \* \*